US011477014B1

(12) United States Patent
Frasco

(10) Patent No.: US 11,477,014 B1
(45) Date of Patent: Oct. 18, 2022

(54) ANONYMIZED DATA TRANSMISSION USING PER-USER-FUNCTIONALITY SECRET SHARES

(71) Applicant: Liberty Mutual Insurance Company, Boston, MA (US)

(72) Inventor: Gregory Frasco, Cambridge, MA (US)

(73) Assignee: Liberty Mutual Insurance Company, Boston, MA (US)

( * ) Notice: Subject to any disclaimer, the term of this patent is extended or adjusted under 35 U.S.C. 154(b) by 80 days.

(21) Appl. No.: 16/996,423

(22) Filed: Aug. 18, 2020

Related U.S. Application Data

(60) Provisional application No. 62/890,733, filed on Aug. 23, 2019.

(51) Int. Cl.
*H04L 9/08* (2006.01)
*H04L 9/06* (2006.01)

(52) U.S. Cl.
CPC ............ *H04L 9/085* (2013.01); *H04L 9/0662* (2013.01); *H04L 9/0825* (2013.01); *H04L 9/0866* (2013.01); *H04L 2209/50* (2013.01)

(58) Field of Classification Search
CPC ..... H04L 9/085; H04L 9/0662; H04L 9/0825; H04L 9/0866; H04L 2209/50
See application file for complete search history.

(56) References Cited

U.S. PATENT DOCUMENTS

| 6,938,022 | B1 | 8/2005 | Singhal |
| 7,697,691 | B2 | 4/2010 | Sutton, II et al. |
| 8,413,261 | B2 | 4/2013 | Nemoy et al. |
| 8,572,119 | B2 | 10/2013 | Savage et al. |
| 8,966,649 | B2 | 2/2015 | Stack et al. |
| 9,148,283 | B1 | 9/2015 | Shankar et al. |

(Continued)

FOREIGN PATENT DOCUMENTS

WO 2016/073057 A2 5/2016

OTHER PUBLICATIONS

"2018 Cost of a Data Breach Study: Global Overview," Ponemon Institute, Jul. 2018, (47 pages).

(Continued)

*Primary Examiner* — Philip J Chea
*Assistant Examiner* — Sangseok Park
(74) *Attorney, Agent, or Firm* — Alston & Bird LLP

(57) ABSTRACT

There is a need for more effective and efficient secure data transmission. This need can be addressed by, for example, solutions for secure data transmission that utilize per-user-functionality secret shares. In one example, a method includes generating a hashed user identifier based on a received user identifier; transmitting the hashed user identifier to an external computing entity; and receiving a data retrieval secret share from the external computing entity, wherein: (i) the data retrieval secret share is selected from a plurality of per-user-functionality secret shares, (ii) the plurality of per-user-functionality secret shares are generated based on a secret value, (iii) the secret value is generated based on the hashed user identifier, (iv) the secret value is used to generate a user data private key, and (v) the external computing entity is configured to encrypt user-provided data using the user data private key prior to transmission of the encrypted user-provided data.

17 Claims, 13 Drawing Sheets

(56) References Cited

U.S. PATENT DOCUMENTS

| | | | |
|---|---|---|---|
| 9,331,984 B2 | 5/2016 | Matsuo | |
| 9,565,020 B1* | 2/2017 | Camenisch | H04L 63/0815 |
| 2003/0147536 A1* | 8/2003 | Andivahis | H04L 9/083 380/277 |
| 2015/0304315 A1* | 10/2015 | Estehghari | H04L 9/0825 713/156 |
| 2015/0371052 A1* | 12/2015 | Lepeshenkov | H04L 63/06 713/165 |
| 2016/0323247 A1 | 11/2016 | Stein | |
| 2017/0149796 A1* | 5/2017 | Gvili | H04L 9/0625 |
| 2018/0176017 A1* | 6/2018 | Rodriguez | H04L 63/0861 |
| 2018/0197239 A1 | 7/2018 | Waelbroeck et al. | |
| 2019/0213356 A1 | 7/2019 | Vágujhelyi et al. | |
| 2019/0258820 A1 | 8/2019 | Gaspar et al. | |

OTHER PUBLICATIONS

"TRUSTe/National Cyber Security Alliance U.S. Consumer Privacy Index 2016 Infographic," U.S. Consumer Privacy Index, (2016), Infographic—Stay Safe Online, (5 pages). [Retrieved from the Internet Oct. 20, 2020]<URL: https://staysafeonline.org/resource/trustenational-cyber-security-alliance-u-s-consumer-privacy-index-2016-infographic/#:~:text=The%20TRUSTe%2FNational%20Cyber%20Security,their%20principle%20source%20of%20income.>.

Apple, "Privacy," (8 pages). [Retrieved from the Internet Oct. 20, 2020]<URL: https://www.apple.com/privacy/>.

Bissoli, Andrea et al. "Authentication as a Service: Shamir Secret Sharing With Byzantine Components," PrePrint arXiv:1806.07291v1 [cs.CR], Jun. 19, 2018, (105 pages).

Burns, Jonathan et al. "EC-OPRF: Oblivious Pseudorandom Functions Using Elliptic Curves," IACR Cryptololgy ePrint Archives, (2017), (13 pages).

Contiu, Stefan et al. "Anonymous and Confidential File Sharing Over Untrusted Clouds," preprint arXiv:1907.06466v3 [cs.CR], Apr. 6, 2020, (11 pages). DOI: 10.1109/SRDS47363.2019.00013.

Kaaniche, Nesrine et al. "ID-Based Cryptography for Secure Cloud Data Storage," In Cloud Computing (CLOUD), 2013 IEEE Sixth International Conference, Jun. 2013, (8 pages). DOI: 10.1109/CLOUD.2013.80.

Mrad, Ahmad Ben et al. "libsodium," Natural Performance Manager, (9 pages). [Article, Online], [Retrieved from the Internet Oct. 20, 2020]<URL: https://www.npmjs.com/package/libsodium>.

Shamir, Adi. "How to Share a Secret," Massachusetts Institute of Technology, Laboratory for Computer Science, Apr. 1979, (14 pages).

\* cited by examiner

FIG. 11

ANONYMIZED DATA TRANSMISSION USING PER-USER-FUNCTIONALITY SECRET SHARES

CROSS-REFERENCE TO RELATED APPLICATIONS

The present application is a non-provisional patent application that claims priority to U.S. Provisional Patent Application No. 62/890,733, filed Aug. 23, 2019, which is incorporated herein by reference in its entirety.

BACKGROUND

Various embodiments of the present invention address technical challenges related to performing secure data transmission. Various embodiments of the present invention address the shortcomings of existing data transmission systems and disclose various techniques for efficiently and reliably performing secure data transmission.

BRIEF SUMMARY

In general, embodiments of the present invention provide methods, apparatus, systems, computing devices, computing entities, and/or the like for performing secure data transmission. Certain embodiments of the present invention utilize systems, methods, and computer program products that perform secure data transmission by using per-user-functionality secret shares such as data retrieval secret shares, data evaluation secret shares, data auditing secret shares, and data auditing validation secret shares.

In accordance with one aspect, a method is provided. In one embodiment, the method comprises: generating a hashed user identifier based at least in part on a received user identifier; transmitting the hashed user identifier to a client computing entity; and receiving a data retrieval secret share from the client computing entity, wherein: (i) the data retrieval secret share is selected from a plurality of per-user-functionality secret shares, (ii) the plurality of per-user-functionality secret shares are generated based at least in part on a secret value, (iii) the secret value is generated based at least in part on the hashed user identifier, (iv) the secret value is used to generate a user data private key, and (v) the client computing entity is configured to encrypt the user-provided data using the user data private key to generate encrypted user-provided data prior to transmission of the encrypted user-provided data.

In accordance with another aspect, a computer program product is provided. The computer program product may comprise at least one computer-readable storage medium having computer-readable program code portions stored therein, the computer-readable program code portions comprising executable portions configured to: generate a hashed user identifier based at least in part on a received user identifier; transmit the hashed user identifier to a client computing entity; and receive a data retrieval secret share from the client computing entity, wherein: (i) the data retrieval secret share is selected from a plurality of per-user-functionality secret shares, (ii) the plurality of per-user-functionality secret shares are generated based at least in part on a secret value, (iii) the secret value is generated based at least in part on the hashed user identifier, (iv) the secret value is used to generate a user data private key, and (v) the client computing entity is configured to encrypt the user-provided data using the user data private key to generate encrypted user-provided data prior to transmission of the encrypted user-provided data.

In accordance with yet another aspect, an apparatus comprising at least one processor and at least one memory including computer program code is provided. In one embodiment, the at least one memory and the computer program code may be configured to, with the processor, cause the apparatus to: generate a hashed user identifier based at least in part on a received user identifier; transmit the hashed user identifier to a client computing entity; and receive a data retrieval secret share from the client computing entity, wherein: (i) the data retrieval secret share is selected from a plurality of per-user-functionality secret shares, (ii) the plurality of per-user-functionality secret shares are generated based at least in part on a secret value, (iii) the secret value is generated based at least in part on the hashed user identifier, (iv) the secret value is used to generate a user data private key, and (v) the client computing entity is configured to encrypt the user-provided data using the user data private key to generate encrypted user-provided data prior to transmission of the encrypted user-provided data.

BRIEF DESCRIPTION OF THE DRAWINGS

Figure 1:
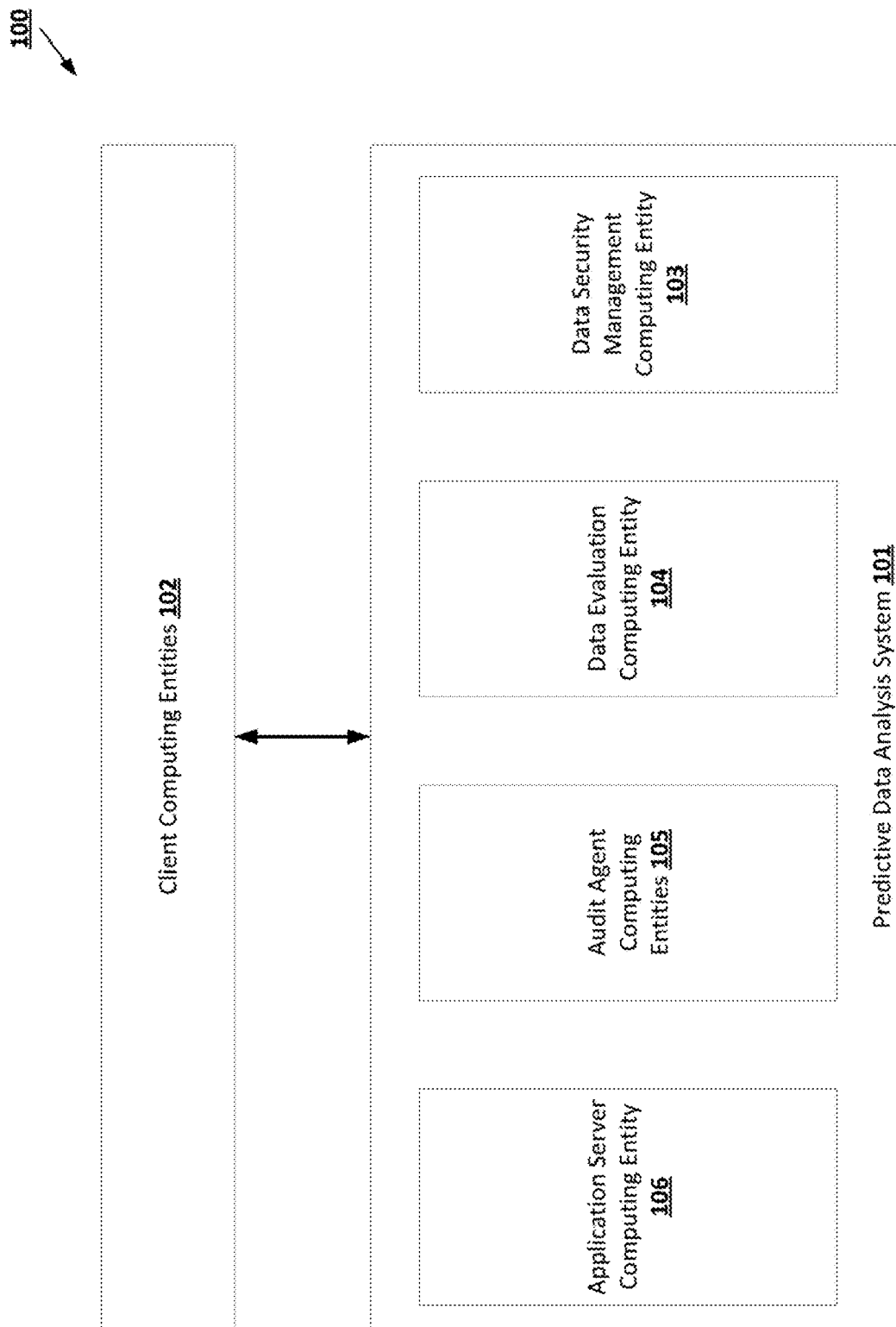

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
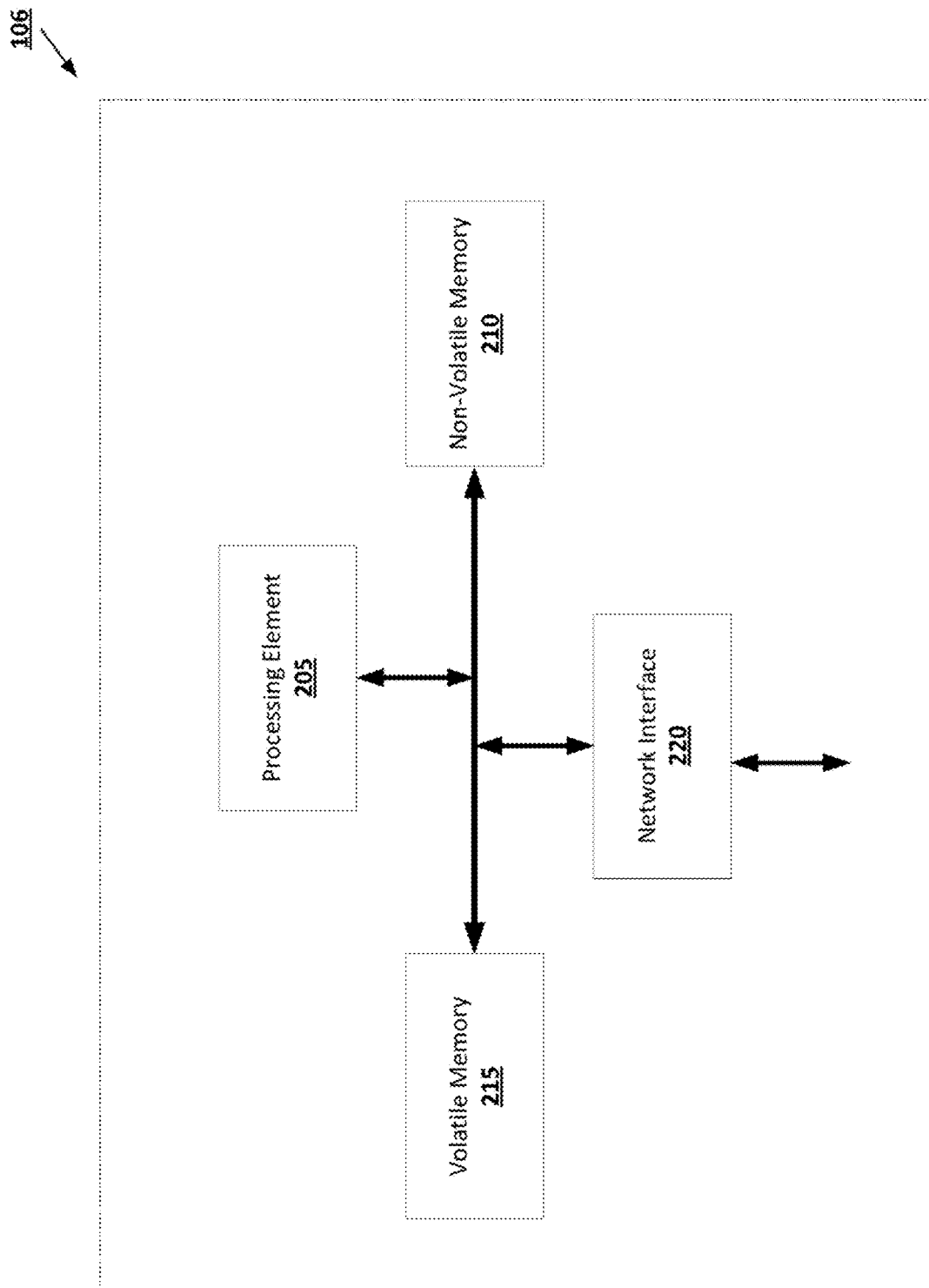

FIG. 2 provides an example application server computing entity in accordance with some embodiments discussed herein.

Figure 3:
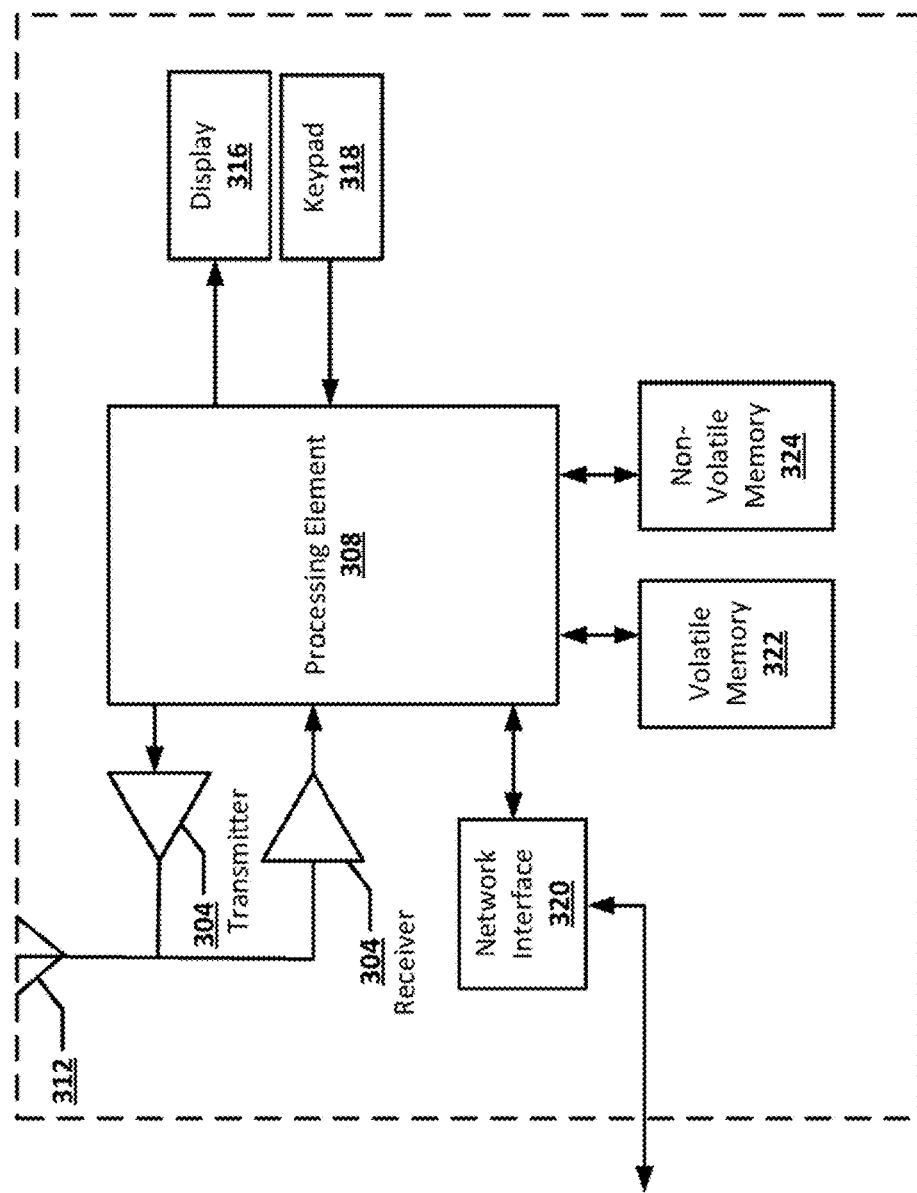

FIG. 3 provides an example client computing entity in accordance with some embodiments discussed herein.

Figure 4:
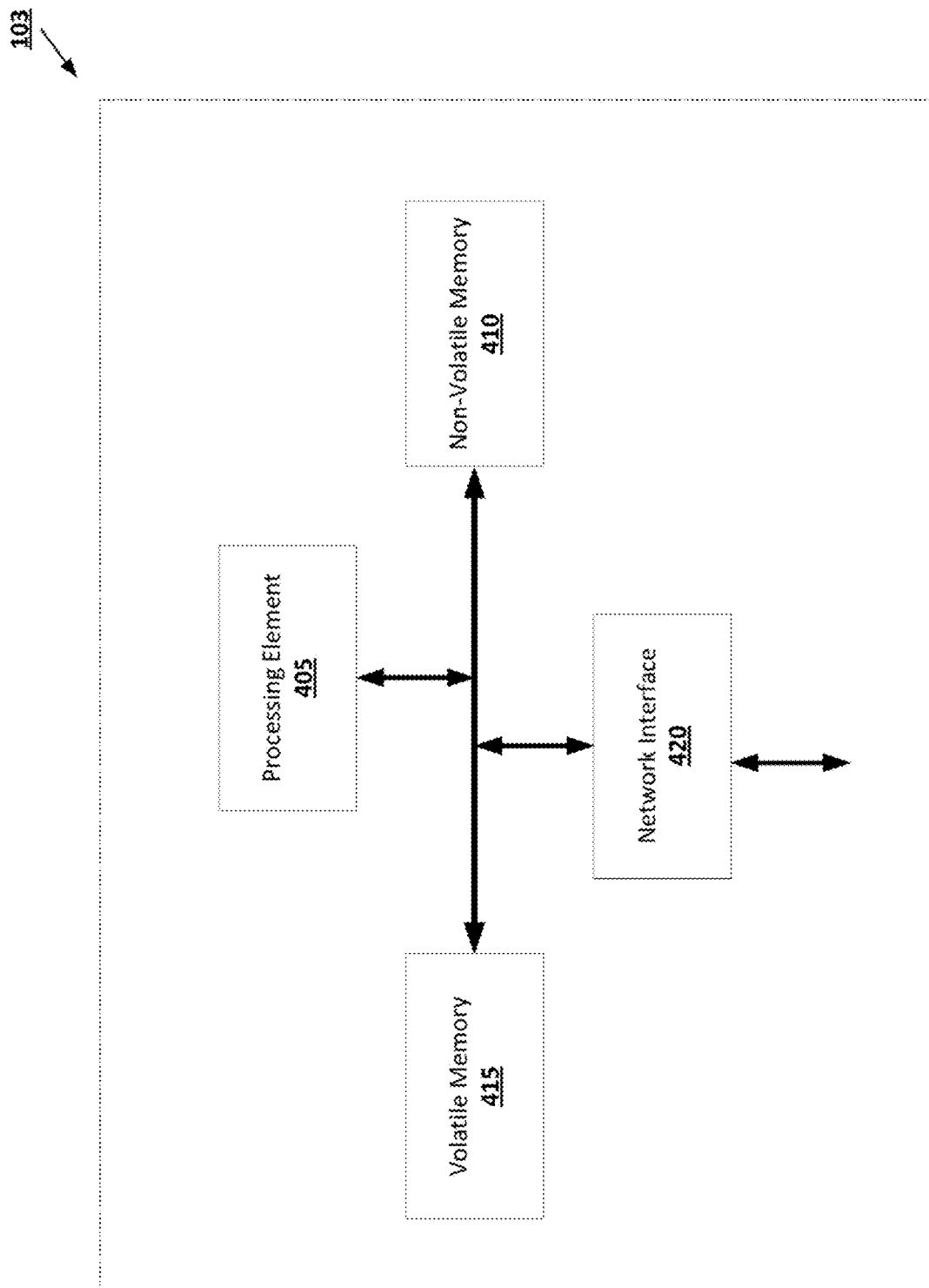

FIG. 4 provides an example data security management computing entity in accordance with some embodiments discussed herein.

Figure 5:
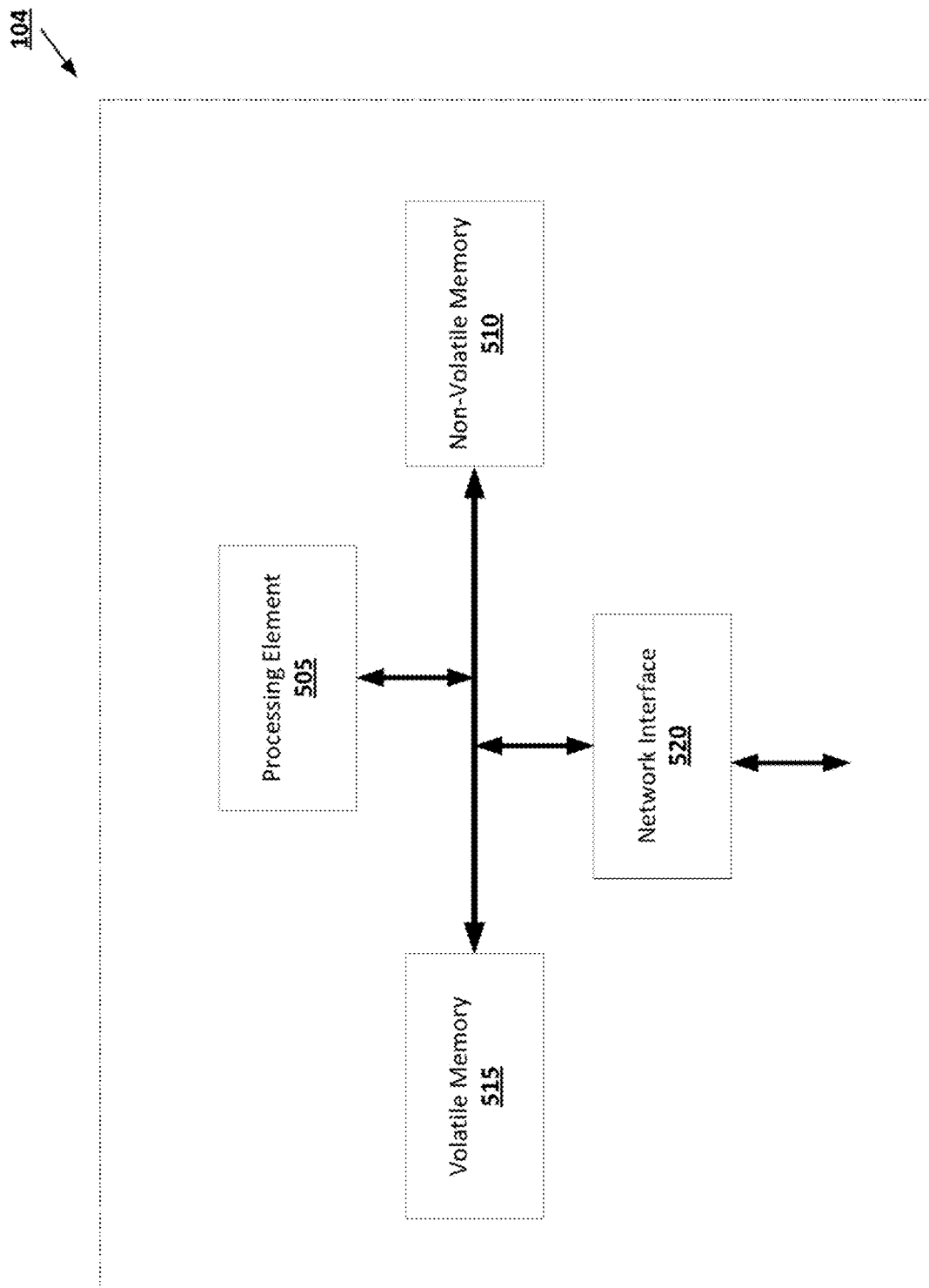

FIG. 5 provides an example data evaluation computing entity in accordance with some embodiments discussed herein.

Figure 6:
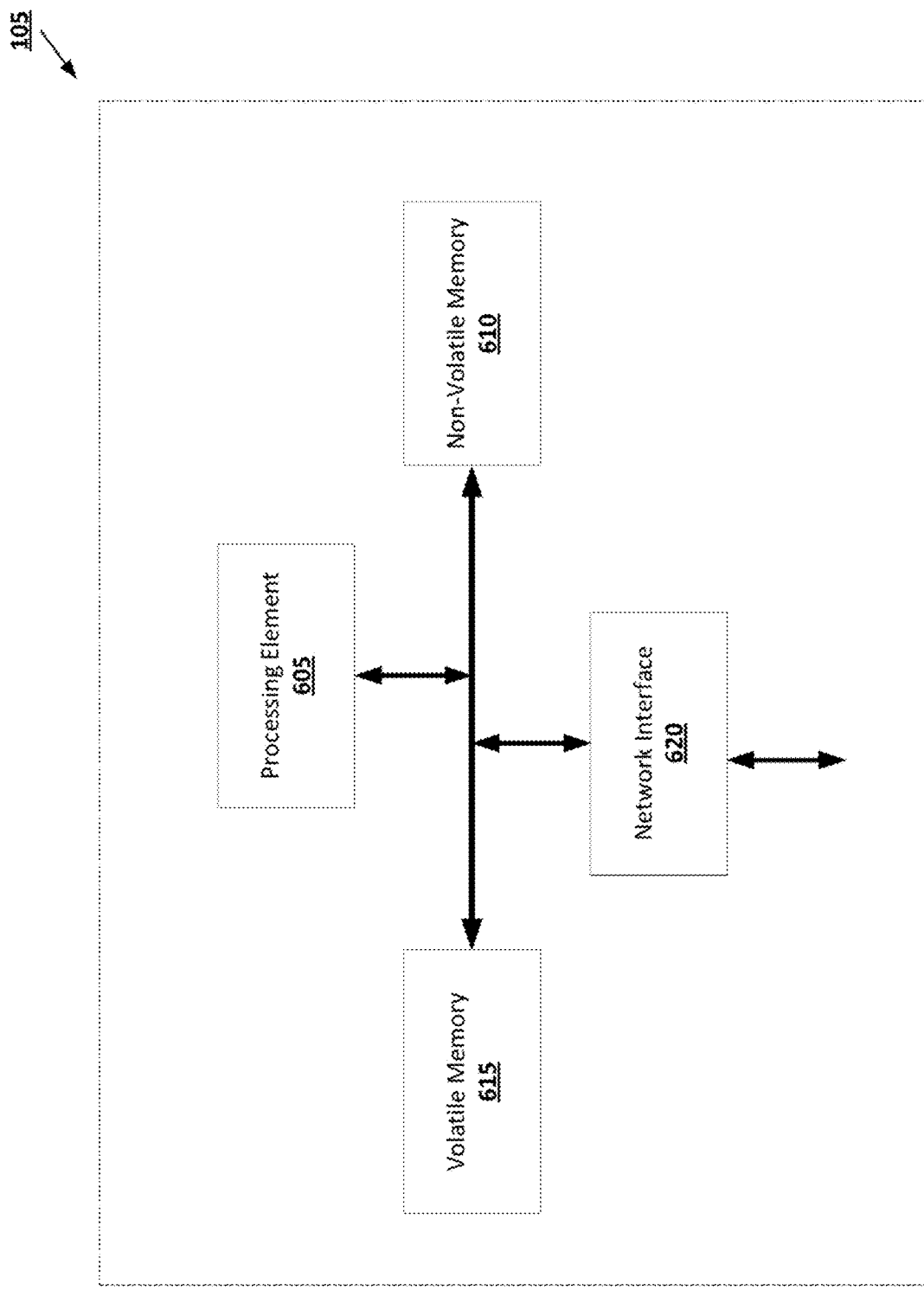

FIG. 6 provides an example audit agent computing entity in accordance with some embodiments discussed herein.

Figure 7:
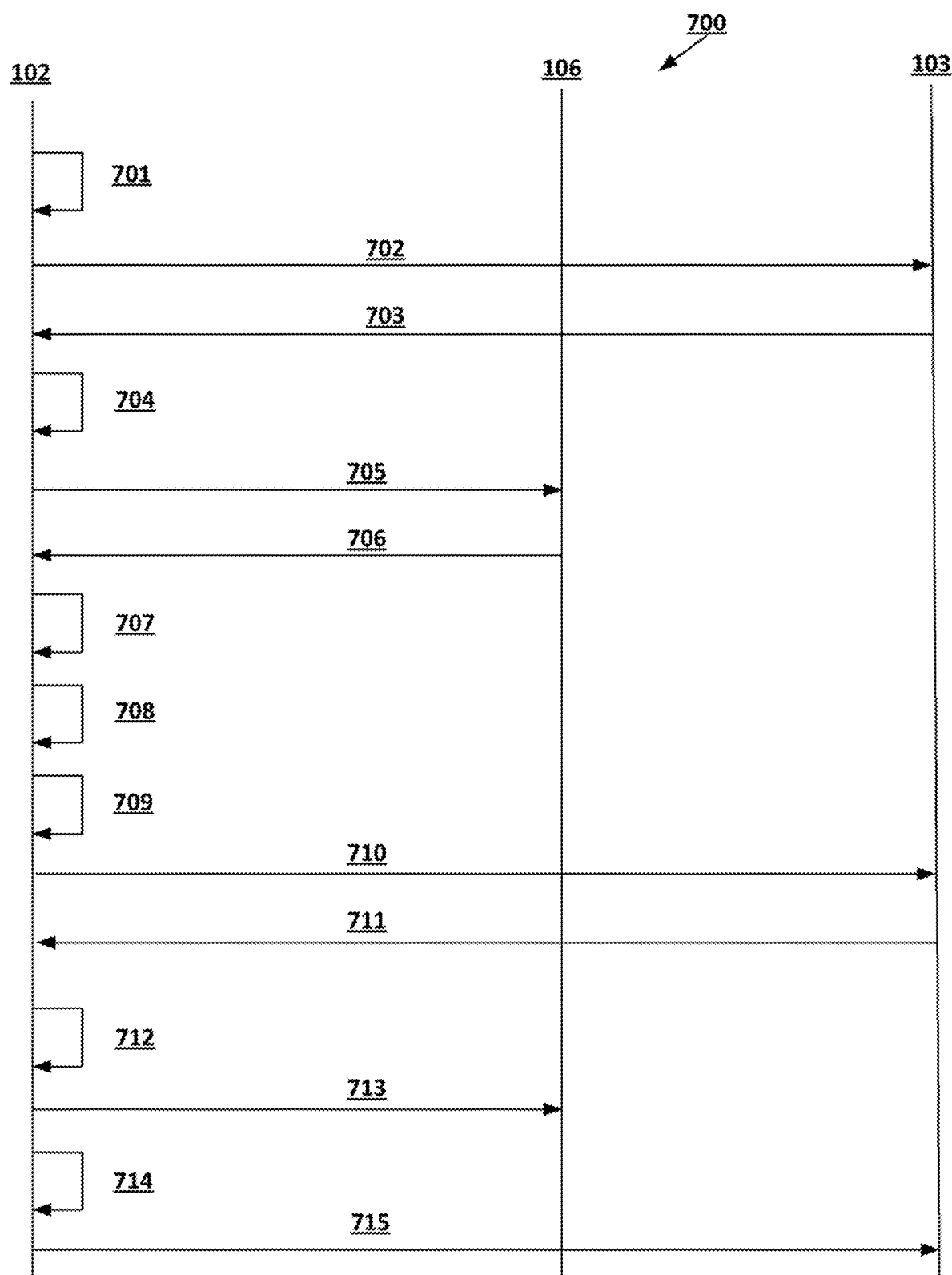

FIG. 7 provides a network flow diagram of an example process for submission of encrypted user-provided data in accordance with some embodiments discussed herein.

Figure 8:
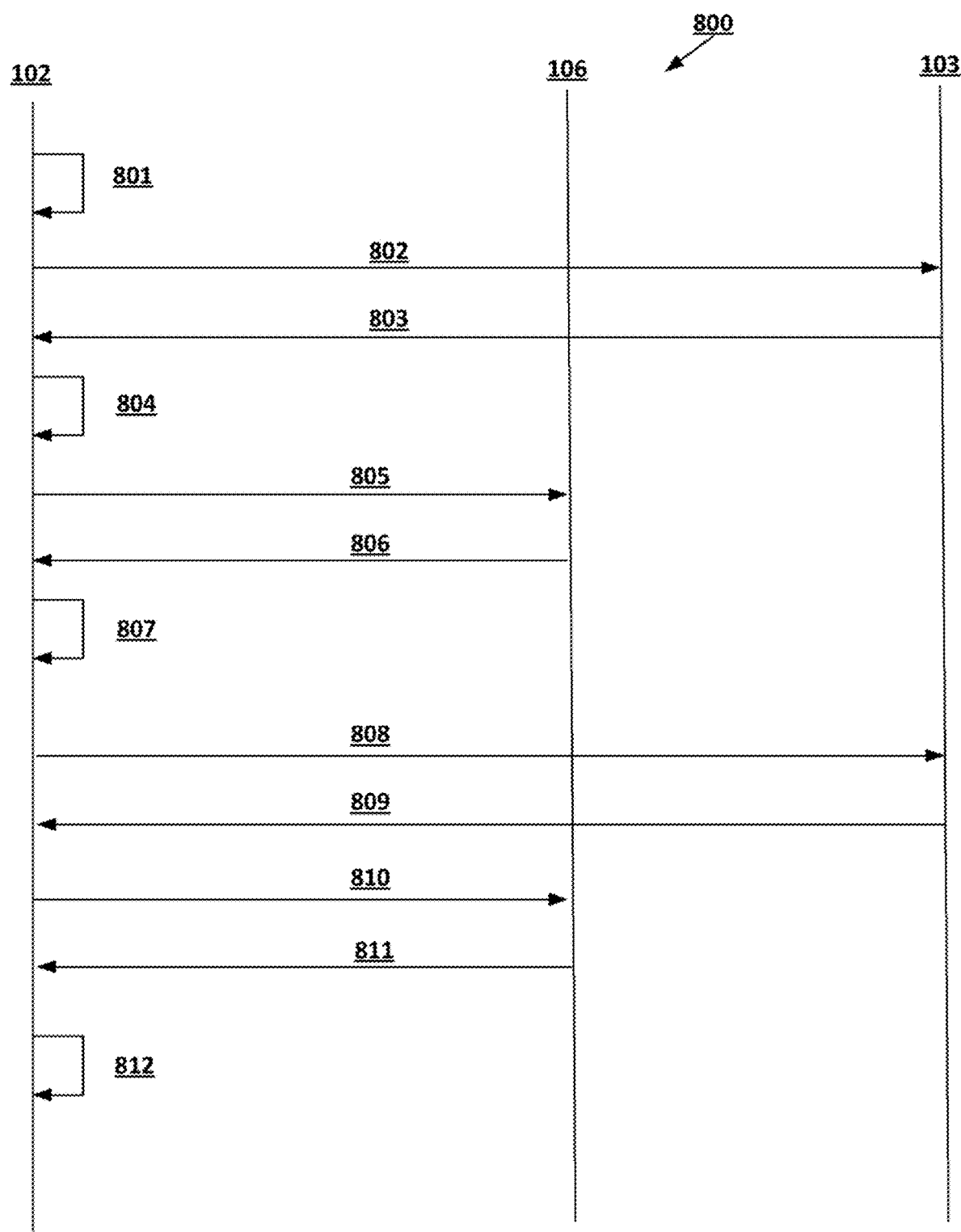

FIG. 8 provides a network flow diagram of an example process for retrieval of encrypted historical user-provided data in accordance with some embodiments discussed herein.

Figure 9:
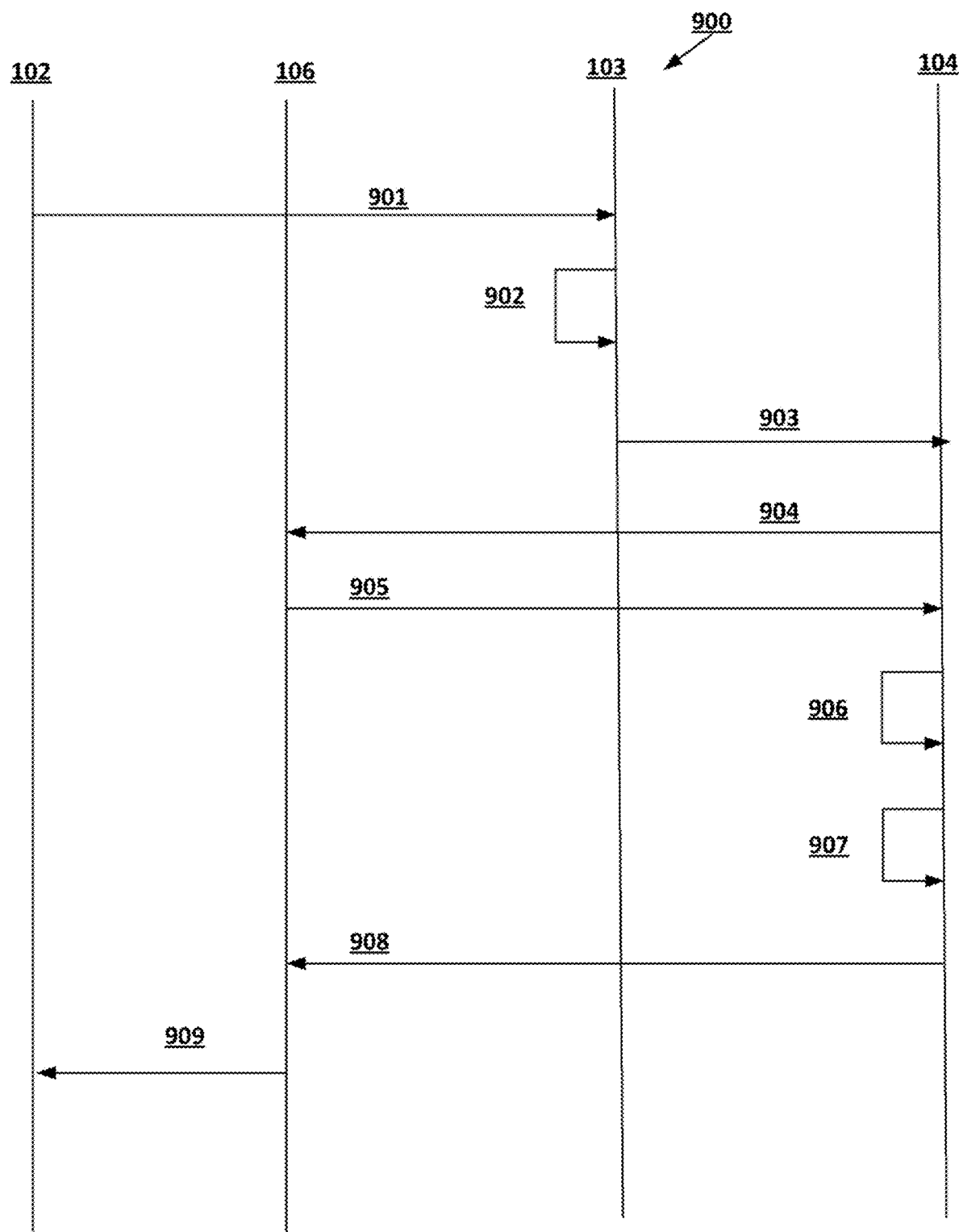

FIG. 9 provides a network flow diagram of an example process for performing a data evaluation operation using encrypted user-provided data in accordance with some embodiments discussed herein.

Figure 10:
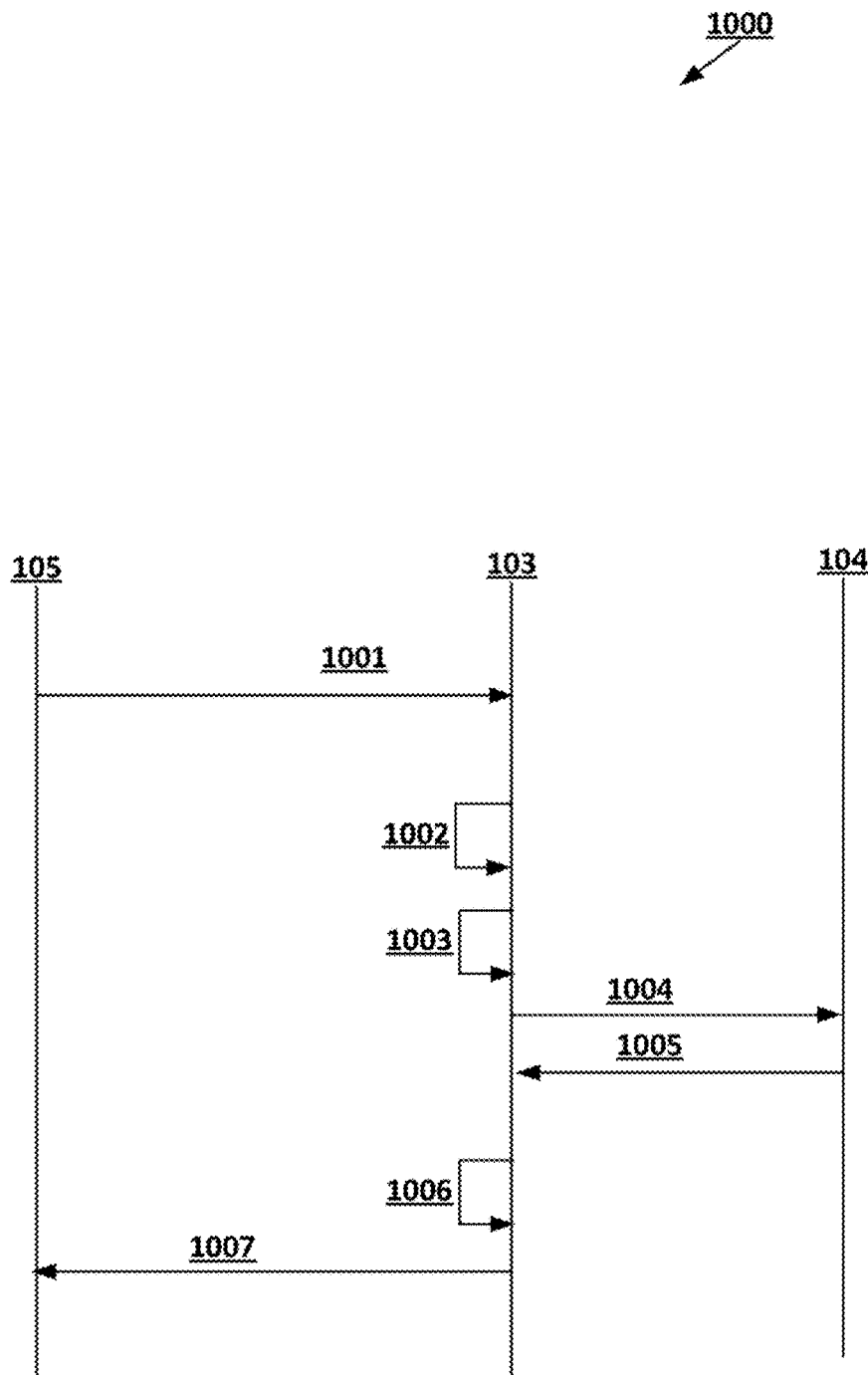

FIG. 10 provides a network flow diagram of an example process for performing a data auditing operation using encrypted audit data records in accordance with some embodiments discussed herein.

Figure 11:
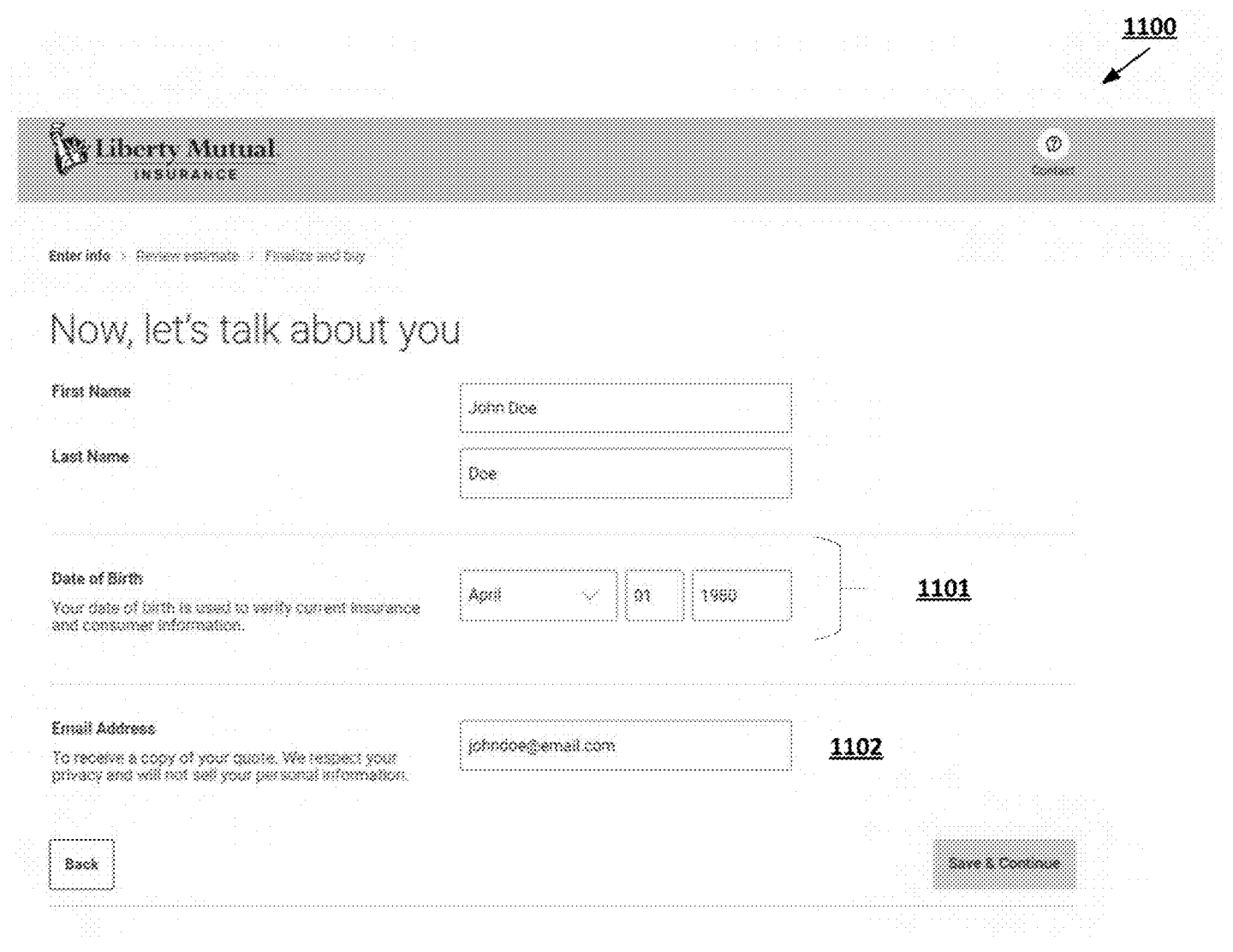

FIG. 11 provides an operational example of an input entry user interface configured to receive sensitive user-provided information in accordance with some embodiments discussed herein.

Figure 12:
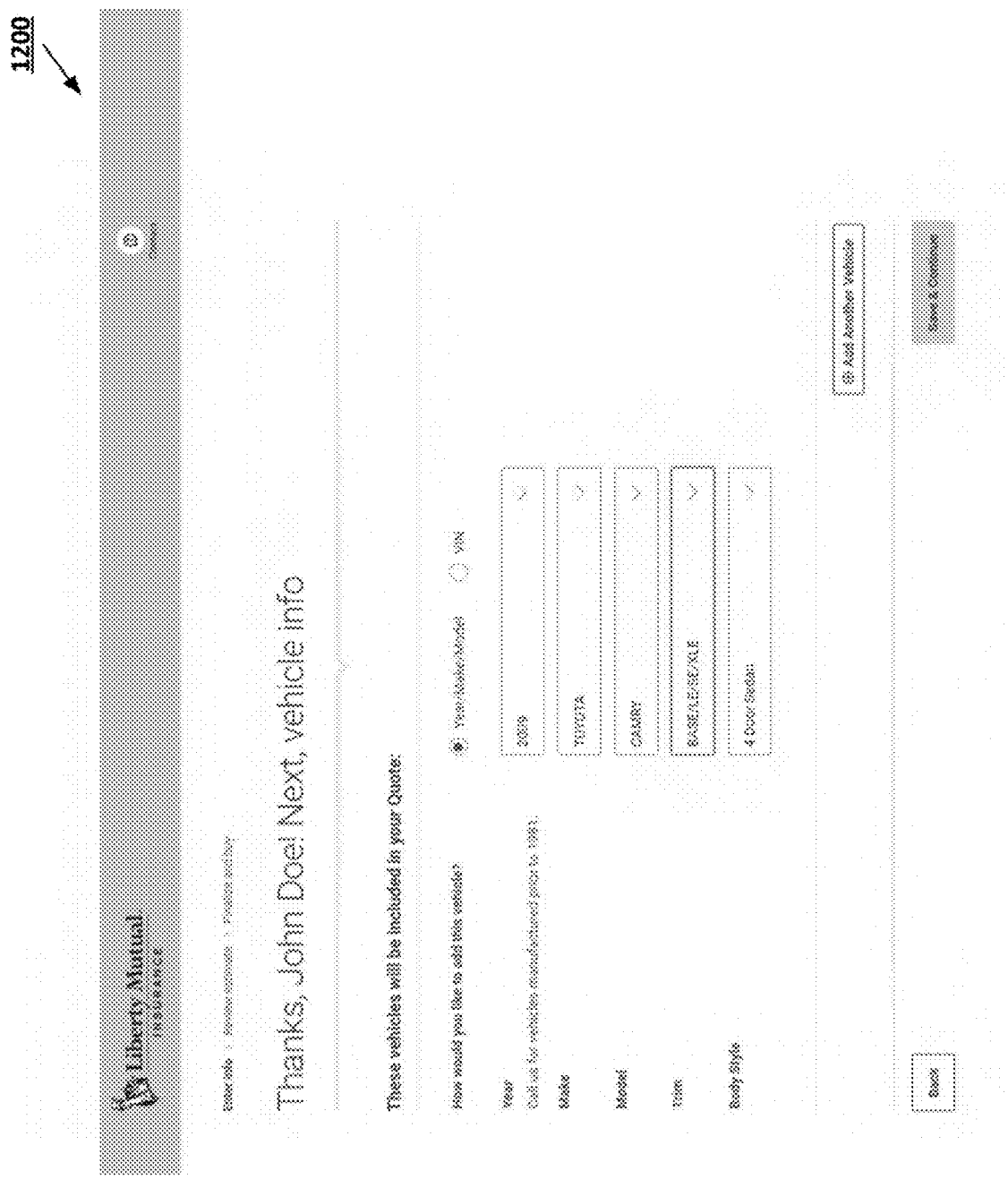

FIG. 12 provides an operational example of an input entry user interface configured to receive user-provided data in accordance with some embodiments discussed herein.

Figure 13:
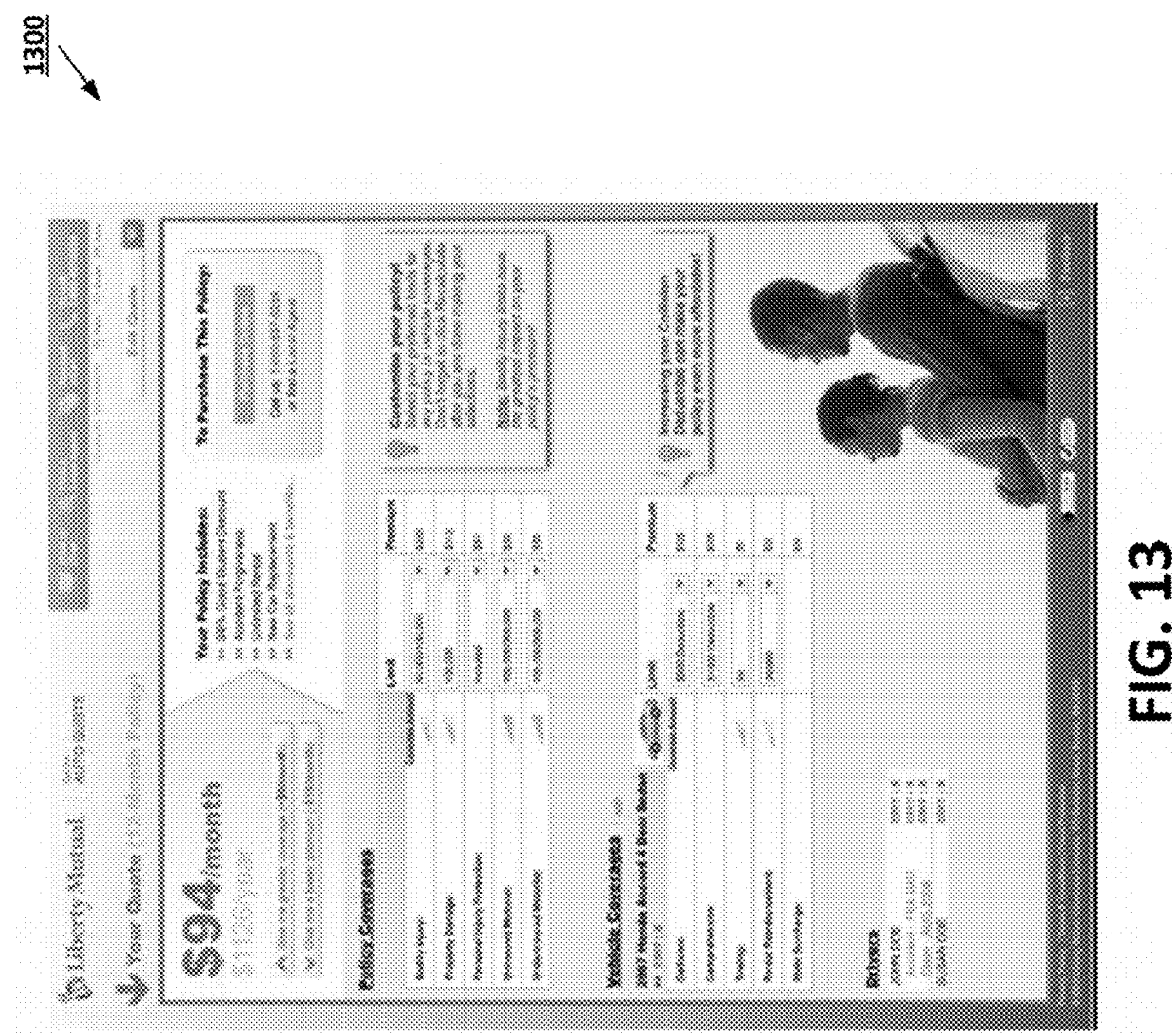

FIG. 13 provides an operational example of an evaluation output user interface in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview

Various embodiments of the present invention introduce techniques for anonymized data retention and transmission that reduce the probability of unauthorized exposure of user sensitive information by utilizing at least one of the following techniques: (i) storing user data indexed by user accounts that are in turn generated by processing selected user data fields using a one-way transformation model, (ii) searching for user records via pairing secret shares provided by the user with secret values maintained in a data evaluation, where neither the secret shares nor the secret values can be used to generate underlying user information used to generate the secret shares and the secret values, and (iii) encrypting user data prior to transmission via a user data public key that is maintained on the client side only. By utilizing the noted techniques and other techniques described throughout this document, various embodiments of the present invention make substantial contributions to improving data security and to increasing integrity of data transmission systems, including client-server data transmission systems.

For example, various embodiments of the present invention store user data indexed by user accounts that are in turn generated by processing selected user data fields using a one-way transformation model. In some embodiments, a server system stores user data by processing a user identifier in accordance with a one-way transformation function. While the user identifier itself may be generated based at least in part on user identifying information that may if compromised violate user anonymity, applying the one-way transformation makes it mathematically impossible for an intruder to detect the user identifying information even in the event that the server system database of user identifiers is compromised. In those circumstances, even if the intruder has access to a private key that is associated with a particular transformed user identifier, it cannot detect the identity of the user profile associated with the particular transformed user identifier, which in turn likely hampers the overall success of the intrusion operation.

As another example, various embodiments of the present invention retrieve user records based at least in part on secret shares that correspond to a model defined based at least in part on a secret key maintained by the server system, where neither the secret share nor the secret key can be used to generate any user identifying information used to generate the secret shares and the secret values. In some embodiments, the secret key is generated by applying two sets of irreversible transformations to underlying data, and thus is irreversibly generated based at least in part on underlying user data. In addition to making it mathematically impossible for an intruder to detect the user identifying information even in the event that the server system database of user identifiers is compromised, the noted embodiments of the present invention also make it likely that an intrusion that relies on unauthorized network traffic monitoring will fail, as successful detection of the secret share and the secret key cannot by itself enable successful decryption of desired messages.

As yet another example, various embodiments encrypt user data prior to transmission via a user data private key that is maintained on the client side only. In some embodiments, a client computing entity uses underlying user data to generate a user identifier, then uses a pseudorandom value determined based at least in part on a hashed version of the user identifier to generate the secret key, and then further processes the secret key to generate the user data private key. This user data private key is never transmitted to the server system, nor is any decryption of user data performed on a server system unless during performance of a data evaluation task. These safeguards are configured to minimize the risk that a user data private key is compromised, which may in turn enable using the compromised user data private key to retrieve user identifying information and undermine user anonymity. Thus, by utilizing the above-noted techniques and other techniques described throughout this document, various embodiments of the present invention make substantial contributions to improving data security and to increasing data integrity of data transmission systems, including client-server data transmission systems.

II. Definitions

The term "user identifier" may describe a data entity that is configured to uniquely identify a target user profile, e.g., a user profile of a client computing entity whose corresponding data is being transmitted to the data evaluation system. In some embodiments, the user identifier is generated based at least in part on one or more selected fields of user-provided data associated with the target user profile, for example based at least in part on one or more fields of user-provided data that are deemed to include sensitive information associated with the target user profile and/or based at least in part on one or more fields of user-provided data that are deemed to include identifying information associated with the target user profile. For example, in some embodiments, the user identifier may be generated based at least in part on an email address of the target user profile, a date of birth of the target user profile, or a combination of an email address of the target user profile and a date of birth of the user profile. In some embodiments, to generate the user identifier, the client computing entity may merge (e.g., concatenate) the selected fields of the user-provided data.

The term "hashed user identifier" may describe a data entity that is generated by applying a hashing function to a user identifier. In some embodiments, to generate a hashed user identifier, the data security management computing entity may apply a one-way deterministic model to the user identifier in order to generate a resulting pseudorandom value, where the resulting pseudorandom value does not directly identify the user identifier and cannot be used to generate the user identifier. An example of the noted one-way deterministic model is an oblivious pseudorandom function (OPRF) model, which may process the user identifier using an OPRF secret key (e.g., an OPRF secret key, such as an OPRF secret key maintained in a storage component of the data security management computing entity) in order to generate the hashed user identifier, where the OPRF model is configured to generate the hashed user identifier based at least in part on the user identifier but not vice versa. However, while various embodiments of the present invention describe generating a hashed user identifier by using an OPRF model, a person of ordinary skill in the relevant technology will recognize that other hashing schemes, such as hashing schemes utilizing one-way deterministic models other than the described OPRF model, may also be utilized in addition to or instead of the OPRF-based schemes in order to generate a hashed user identifier based at least in part on a user identifier. In some embodiments, the hashed user identifier is configured to have a sufficient entropy to enable using the hashed user identifier in a secret sharing algorithm, such as the secret sharing algorithm discussed below.

The term "user-identifying value" may refer to a data entity that is configured to describe a value that is determined by applying a transformational function to a hashed user identifier. In some embodiments, a client computing entity determines, based at least in part on the hashed user identifier, two user-identifying values (e.g., two pseudorandom user-identifying values): a multiplier value (m) and a secret value (b). For example, in some embodiments, the client computing entity may apply a key derivation model (e.g., a key derivation function) to the hashed user identifier in order to generate the multiplier value and the secret value. In some embodiments, at least one of the multiplier value and the secret value is a 32-byte value, such as a 32-byte pseudorandom value. The key derivation model may be a model that utilizes a key derivation function, where the key derivation function may in turn be able to process a master key (e.g., the hashed user identifier) in order to generate one or more subkeys (e.g., the multiplier value and the secret value), where the subkeys can be deterministically computed from the master key, but the subkeys cannot be used to generate the master key. An examples of a key derivation function is the key derivation function provided by libsodium.js, which is a sodium crypto library complied to WebAssembly and Javascript (see https://www.npmjs.com/package/libsodium).

The term "data evaluation request identifier" may refer to a data entity that is configured to uniquely identify a data evaluation task requested by a client computing entity, where the data evaluation task may be configured to determine a desired evaluation conclusion for a user profile of the client computing entity in accordance with corresponding user-provided data that may, during one or more user interaction sessions, be transmitted by the client computing entity to a data evaluation system. An example of a data evaluation task is an insurance quote request that may be transmitted by a user profile of a client computing entity to a data evaluation system that is associated with an insurance company consumer interaction interface. In the noted example, the data evaluation request identifier may be a quote identifier. As described below, the data evaluation request identifier may be used to generate a data retrieval secret share that can then be used to obtain user-related data items (e.g., account identifier data and/or auditing public key data) from the data security management computing entity. In some embodiments, the request to obtain the data evaluation request identifier for a corresponding data evaluation request describes the hashed user identifier associated with the corresponding data evaluation request.

The term "per-user-functionality secret share" may refer to a data entity that is configured to describe a secret share that is configured to be provided by a client computing entity to a data evaluation system as part of a request for a corresponding user functionality in order to at least in part obtain access to (e.g., locate and obtain authorization to access) relevant data (e.g., relevant user-provided data) needed to perform the corresponding user functionality. Examples of per-user-functionality secret shares discussed herein include data retrieval secret shares, data evaluation secret shares, and data auditing secret shares, as described in greater detail below.

The term "data retrieval secret share" may refer to a data entity that is configured to, when transmitted to a data security management computing entity by a client computing entity, cause the data security management computing entity to transmit access-enabling data, where the access-enabling data is configured to enable the client computing entity to access encrypted data stored on a data evaluation system. For example, the data retrieval secret share may, when transmitted to the data security management computing entity by the client computing entity, cause the data security management computing entity to transmit an account identifier and/or an auditing public key, where the account identifier may be configured to enable the client computing entity to obtain encrypted user-provided data from an application server computing entity, and further where the auditing public key may be configured to enable the client computing entity to encrypt a data auditing secret share. In some embodiments, to generate the data retrieval secret share, the client computing entity generates the linear model $S_q=mQ+b$, where $S_q$ is a linear output value for the provided linear relationship model, m is the multiplier value for the provided linear relationship model, b is the secret value for the provided linear relationship model, and Q is a hash value generated based at least in part on a data retrieval request identifier for the provided linear relationship model. In some of the noted embodiments, after generating the provided linear relationship model, the client computing entity determines the value of $S_q$ based at least in part on the noted linear model and generates the data retrieval secret share based at least in part on the combination of the $S_q$ value and the Q value. An example of a data retrieval secret share is the tuple $(S_q, Q)$.

The term "data evaluation secret share" may refer to a data entity that is configured to, when transmitted to a data security management computing entity by a client computing entity, cause the data security management computing entity to trigger a group of operations, where the noted group of operations may be configured to cause a data evaluation system to generate a data evaluation conclusion and transmit the data evaluation prediction to the client computing entity. For example, a data evaluation secret share may cause the data security management computing entity to transmit an account identifier to the data evaluation computing entity in order to cause the data evaluation computing entity to retrieve encrypted user-provided data from an application server computing entity, decrypt the encrypted user-provided data, process the decrypted user-provided data to generate a data evaluation conclusion (e.g., a proposed insurance rate), and provide the data evaluation conclusion to the application server computing entity for subsequent transmission to a client computing entity. In some embodiments, to generate the data evaluation secret share, the client computing entity generates the linear model $S_r=mR+b$, where $S_r$ is a linear output value for the provided linear relationship model, m is the multiplier value for the provided linear relationship model, b is the secret value for the provided linear relationship model, and R is a random value and/or a pseudorandom value. In some of the noted embodiments, after generating the noted linear model, the client computing entity determines the value of $S_r$ based at least in part on the noted linear model and generates the data evaluation secret share based at least in part on the combination of the $S_r$ value and the R value. An example of a data evaluation secret share is the tuple $(S_r, R)$.

The term "data auditing secret share" may refer to a data entity that is configured to be utilized by a data evaluation system to decrypt audit records determined based at least in part on results of evaluating user-provided data associated with various data evaluation tasks in response to a data auditing request. An example of a data auditing request is a request to audit quote records in response to regulatory audit operations. In some of the noted embodiments, a data security management computing entity may utilize data auditing secret shares to determine data auditing private keys that can, during an auditing process triggered by a data auditing request and in response to satisfaction of predefined audit validation criteria, be used to decrypt audit records associated with rated insurance quotes. In some embodiments, to generate the data auditing secret share, a client computing entity generates the linear model $S_a=mA+b$, where $S_a$ is a linear output value for the provided linear relationship model, m is the multiplier value for the provided linear relationship model, b is the secret value for the provided linear relationship model, and A is a random value and/or a pseudorandom value. In some of the noted embodiments, after generating the noted linear model, the client computing entity determines the value of $S_a$ based at least in part on the noted linear model and generates the data auditing secret share based at least in part on the combination of the $S_a$ value and the value. An example of a data auditing secret share is the tuple $(S_a, A)$.

The term "audit validation secret share" may refer to a data entity that is configured to describe a combination of values that correspond to applicable input and output of a data audit validation model, where the data audit validation model may be a two-dimensional polynomial of degree n that relates one or more multiplier/coefficient values to a y-intercept value. For example, if the data audit validation model describes a degree-one polynomial, then the data audit validation model relates the multiplier value m to the y-intercept value b, for example as is the case with the degree-one audit validation model $Y=mX+b$. As another example, if the data audit validation model is a degree-two polynomial, then the data audit validation model relates the multiplier values $m_1$ and $m_2$ to the y-intercept value b, for example as is the case with the degree-two audit validation model $Y=m_1X^2+m_2X+b$. As yet another example, if the data audit validation model is a degree-three polynomial, then the data audit validation model relates the multiplier values $m_1$, $m_2$, and $m_3$ to the y-intercept value b, for example as is the case with the degree-three audit validation model $Y=m_2X^3+m_2X^2+m_3X+b$.

The term "user data private key" may refer to a data entity that is configured to describe a private key used by a client computing entity to encrypt user-provided data prior to transmission of the noted encrypted user-provided data (e.g., prior to transmission of the noted encrypted user-provided data to an application server computing entity). In some embodiments, the client computing entity generates the user data private key based at least in part on the secret value (b).

For example, the client computing entity may generate the user data private key by applying a one-way transformation model to the secret value.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing anonymized data retention/transmission. The architecture 100 includes a data evaluation system 101 configured to receive data evaluation requests from client computing entities 102, process the data evaluation requests to generate evaluation conclusions, provide the evaluation conclusions to the client computing entities 102, and automatically perform evaluation-based actions based at least in part on the evaluation conclusions. An example of an evaluation conclusion that can be generated using the data evaluation system 101 is an insurance quote rating determination and/or an insurance company auditing determination.

In some embodiments, data evaluation system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The data evaluation system 101 may include an application server computing entity 106, a data security management computing entity 103, a data evaluation computing entity 104, and one or more audit agent computing entities 105. Exemplary of the noted computing entities are described in greater detail below with reference to FIGS. 7-13. Moreover, each of the computing entities may have a storage component including one or more storage units. A storage unit may be configured to store input data well as model definition data used by a corresponding computing entity to perform processing. Each storage component may include one or more storage units, such as multiple distributed storage units that are connected through a computer network. Each storage unit in a storage component may store at least one of one or more data assets and/or one or more data about the computed properties of one or more data assets. Moreover, each storage unit in a storage component may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Application Server Computing Entity

FIG. 2 provides a schematic of an application server computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the application server computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the application server computing entity 106 may include, or be in communication with, one or more processing elements 205 (also referred to as processors, processing circuitry, and/or similar terms used herein interchangeably) that communicate with other elements within the application server computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the application server computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the application server computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the application server computing entity 106 with the assistance of the processing element 205 and operating system.

As indicated, in one embodiment, the application server computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the application server computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the application server computing entity 106 may include, or be in communication with, one or more input elements, such as a keyboard input, a mouse input, a touch screen/display input, motion input, movement input, audio input, pointing device input, joystick input, keypad input, and/or the like. The application server computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the application server computing entity 106. In a particular embodiment, the client computing entity 102 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the application server computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the application server computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3

SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the application server computing entity 106 and/or various other computing entities.

In another embodiment, the client computing entity 102 may include one or more components or functionality that are the same or similar to those of the application server computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

Exemplary Data Security Management Computing Entity

FIG. 4 provides a schematic of a data security management computing entity 103 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the data security management computing entity 103 may also include one or more communications interfaces 420 for communicating with various computing entities, such as by communicating data, content, information, and/or similar terms used herein interchangeably that can be transmitted, received, operated on, processed, displayed, stored, and/or the like.

As shown in FIG. 4, in one embodiment, the data security management computing entity 103 may include, or be in communication with, one or more processing elements 405 (also referred to as processors, processing circuitry, and/or similar terms used herein interchangeably) that communicate with other elements within the data security management computing entity 103 via a bus, for example. As will be understood, the processing element 405 may be embodied in a number of different ways.

For example, the processing element 405 may be embodied as one or more complex programmable logic devices (CPLDs), microprocessors, multi-core processors, coprocessing entities, application-specific instruction-set processors (ASIPs), microcontrollers, and/or controllers. Further, the processing element 405 may be embodied as one or more other processing devices or circuitry. The term circuitry may refer to an entirely hardware embodiment or a combination of hardware and computer program products. Thus, the processing element 405 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 405 may be configured for a particular use or configured to execute instructions stored in volatile or non-volatile media or otherwise accessible to the processing element 405. As such, whether configured by hardware or computer program products, or by a combination thereof, the processing element 405 may be capable of performing steps or operations according to embodiments of the present invention when configured accordingly.

In one embodiment, the data security management computing entity 103 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 410, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the data security management computing entity 103 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 415, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 405. Thus, the databases, database instances, database management systems, data, applications, programs, program modules, scripts, source code, object code, byte code, compiled code, interpreted code, machine code, executable instructions, and/or the like may be used to control certain aspects of the operation of the data security management computing entity 103 with the assistance of the processing element 405 and operating system.

As indicated, in one embodiment, the data security management computing entity 103 may also include one or more communications interfaces 420 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the data security management computing entity 103 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the data security management computing entity 103 may include, or be in communication with, one or more input elements, such as a keyboard input, a mouse input, a touch screen/display input, motion input, movement input, audio input, pointing device input, joystick input, keypad input, and/or the like. The data security management computing entity 103 may also include, or be in communication with, one or more output elements (not shown), such as audio output, video output, screen/display output, motion output, movement output, and/or the like.

Exemplary Data Evaluation Computing Entity

FIG. 5 provides a schematic of a data evaluation computing entity 104 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the data evaluation computing entity 104 may also include one or more communications interfaces 520 for communicating with various computing entities, such as by communicating data, content, information, and/or similar terms used herein interchangeably that can be transmitted, received, operated on, processed, displayed, stored, and/or the like.

As shown in FIG. 5, in one embodiment, the data evaluation computing entity 104 may include, or be in communication with, one or more processing elements 505 (also referred to as processors, processing circuitry, and/or similar terms used herein interchangeably) that communicate with other elements within the data evaluation computing entity 104 via a bus, for example. As will be understood, the processing element 505 may be embodied in a number of different ways.

For example, the processing element 505 may be embodied as one or more complex programmable logic devices (CPLDs), microprocessors, multi-core processors, coprocessing entities, application-specific instruction-set processors (ASIPs), microcontrollers, and/or controllers. Further, the processing element 505 may be embodied as one or more other processing devices or circuitry. The term circuitry may refer to an entirely hardware embodiment or a combination of hardware and computer program products. Thus, the processing element 505 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 505 may be configured for a particular use or configured to execute instructions stored in volatile or non-volatile media or otherwise accessible to the processing element 505. As such, whether configured by hardware or computer program products, or by a combination thereof, the processing element 505 may be capable of performing steps or operations according to embodiments of the present invention when configured accordingly.

In one embodiment, the data evaluation computing entity 104 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 510, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the data evaluation computing entity 104 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 515, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 505. Thus, the databases, database instances, database management systems, data, applications, programs, program modules, scripts, source code, object code, byte code, compiled code, interpreted code, machine code, executable instructions, and/or the like may be used to control certain aspects of the operation of the data evaluation computing entity 104 with the assistance of the processing element 505 and operating system.

As indicated, in one embodiment, the data evaluation computing entity 104 may also include one or more communications interfaces 520 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the data evaluation computing entity 104 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the data evaluation computing entity 104 may include, or be in communication with, one or more input elements, such as a keyboard input, a mouse input, a touch screen/display input, motion input, movement input, audio input, pointing device input, joystick input, keypad input, and/or the like. The data evaluation computing entity 104 may also include, or be in communication with, one or more output elements (not shown), such as audio output, video output, screen/display output, motion output, movement output, and/or the like.

Exemplary Audit Agent Computing Entity

FIG. 6 provides a schematic of an audit agent computing entity 105 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the audit agent computing entity 105 may also include one or more communications interfaces 620 for communicating with various computing entities, such as by communicating data, content, information, and/or similar terms used herein interchangeably that can be transmitted, received, operated on, processed, displayed, stored, and/or the like.

As shown in FIG. 6, in one embodiment, the audit agent computing entity 105 may include, or be in communication with, one or more processing elements 605 (also referred to as processors, processing circuitry, and/or similar terms used herein interchangeably) that communicate with other elements within the audit agent computing entity 105 via a bus, for example. As will be understood, the processing element 605 may be embodied in a number of different ways.

For example, the processing element 605 may be embodied as one or more complex programmable logic devices (CPLDs), microprocessors, multi-core processors, coprocessing entities, application-specific instruction-set processors (ASIPs), microcontrollers, and/or controllers. Further, the processing element 405 may be embodied as one or more other processing devices or circuitry. The term circuitry may refer to an entirely hardware embodiment or a combination of hardware and computer program products. Thus, the processing element 605 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 605 may be configured for a particular use or configured to execute instructions stored in volatile or non-volatile media or otherwise accessible to the processing element 605. As such, whether configured by hardware or computer program products, or by a combination thereof, the processing element 405 may be capable of performing steps or operations according to embodiments of the present invention when configured accordingly.

In one embodiment, the audit agent computing entity 105 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 610, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the audit agent computing entity 105 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 615, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 605. Thus, the databases, database instances, database management systems, data, applications, programs, program modules, scripts, source code, object code, byte code, compiled code, interpreted code, machine code, executable instructions, and/or the like may be used to control certain aspects of the operation of the audit agent computing entity 105 with the assistance of the processing element 605 and operating system.

As indicated, in one embodiment, the audit agent computing entity 105 may also include one or more communications interfaces 620 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, audit agent computing entity 105 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the audit agent computing entity 105 may include, or be in communication with, one or more input elements, such as a keyboard input, a mouse input, a touch screen/display input, motion input, movement input, audio input, pointing device input, joystick input, keypad input, and/or the like. The audit agent computing entity 105 may also include, or be in communication with, one or more output elements (not shown), such as audio output, video output, screen/display output, motion output, movement output, and/or the like.

V. Exemplary System Operations

Various embodiments of the present invention introduce techniques for anonymized data retention and transmission that reduce the probability of unauthorized exposure of user sensitive information by utilizing at least one of the following techniques: (i) storing user data indexed by user accounts that are in turn generated by processing selected user data fields using a one-way transformation model, (ii) searching for user records via pairing secret shares provided by the user with secret values maintained in a data evaluation, where neither the secret shares nor the secret values can be used to generate underlying user information used to generate the secret shares and the secret values, and (iii) encrypting user data prior to transmission via a user data public key that is maintained on the client side only. By utilizing the noted techniques and other techniques described throughout this document, various embodiments of the present invention make substantial contributions to improving data security and to increasing integrity of data transmission systems, including client-server data transmission systems.

A. Submission of User-Provided Data

FIG. 7 is a network transmission flow diagram of an example process 700 for data submission by a client computing entity 102 to an application server computing entity 106 according to the anonymized data retention aspects of the present invention. Via the various steps/operations of the process 700, the data evaluation system 101 can store encrypted user-provided data in the data storage component of the application server computing entity 106, where the encryption of the user-provided data is performed based at least in part on a user data private key generated based at least in part on selected user data fields, which in turn eliminates the need to persistently store unencrypted versions of the selected user data fields, the user data public key used to encrypt the user-provided data, and the user data private key that is configured to decrypt the encrypted user-provided data.

The process 700 begins at step/operation 701 when the client computing entity 102 generates a user identifier associated with a target user profile. The user identifier may uniquely identify the target user profile, i.e., a user profile of the client computing entity 102 whose corresponding data is being transmitted to the data evaluation system 101. In some embodiments, the user identifier is generated based at least in part on one or more selected fields of user-provided data associated with the target user profile, for example based at least in part on one or more fields of user-provided data that are deemed to include sensitive information associated with the target user profile and/or based at least in part on one or more fields of user-provided data that are deemed to include identifying information associated with the target user profile. For example, in some embodiments, the user identifier may be generated based at least in part on an email address of the target user profile, a date of birth of the target user profile, or a combination of an email address of the target user profile and a date of birth of the target user profile (e.g., by combining the input of the field 1101 and the field 1102 of the input entry user interface 1100 of FIG. 11). In some embodiments, to generate the user identifier, the client computing entity 102 may merge (e.g., concatenate) the selected fields of the user-provided data. In some embodiments, one objective behind generating the user identifier based at least in part on user-provided data is to eliminate the need for storing the user identifier on the client computing entity 102, which in turn reduces the vulnerability of the architecture 100 to security risks such as attacks by external adversaries, attacks by insider adversaries, and attacks by imposter adversaries. In some of the noted embodiments, because the user identifier can be generated by a predefined combination of defined user-provided fields, the noted user identifier can be generated by the client computing entity 102 at runtime based at least in part on user-provided data provided at runtime, and thus the noted user identifier does not need to be persistently stored on the client computing entity 102.

At step/operation 702, the client computing entity 102 transmits a request to generate a hashed user identifier based at least in part on the user identifier to the data security management computing entity 103. The purpose of transmitting the noted hash generation request may be to cause the data security management computing entity 103 to generate the hashed user identifier by applying a one-way deterministic model to the user identifier in order to generate a resulting pseudorandom value, where the resulting pseudorandom value does not directly identify the user identifier and cannot be used to generate the user identifier. One objective of generating the hashed user identifier in the noted manner may be to eliminate the need for storing the user identifier on the data evaluation system 101, which in turn reduces the vulnerability of the data evaluation system 101 to security attacks such as attacks by external adversaries, attacks by insider adversaries, and attacks by imposter adversaries. In some of the noted embodiments, because the data security management computing entity 103 can perform its operations using the hashed user identifier, the data security management computing entity 103 does not need to store the user identifier which may include sensitive user-provided data fields.

At step/operation 703, in response to receiving the request to generate the hashed user identifier from the client computing entity 102, the data security management computing entity 103 generates the hashed user identifier and transmits the generated hashed user identifier to the client computing entity 102. As noted above, to generate the hashed user identifier, the data security management computing entity 103 may apply one-way deterministic model to the user identifier in order to generate a resulting pseudorandom value, where the resulting pseudorandom value does not directly identify the user identifier and cannot be used to generate the user identifier. An example of the noted one-way deterministic model is an oblivious pseudorandom function (OPRF) model, which may process the user identifier using an OPRF secret key (e.g., an OPRF secret key, such as an OPRF secret key maintained in a storage component of the data security management computing entity 103) in order to generate the hashed user identifier, where the OPRF model is configured to generate the hashed user identifier based at least in part on the user identifier but not vice versa. However, while various embodiments of the present invention describe generating a hashed user identifier by using an OPRF model, a person of ordinary skill in the relevant technology will recognize that other hashing schemes, such as hashing schemes utilizing one-way deterministic models other than the described OPRF model, may also be utilized in addition to or instead of the OPRF-based schemes in order to generate a hashed user identifier based at least in part on a user identifier. In some embodiments, the hashed user identifier is configured to have a sufficient entropy to enable using the hashed user identifier in a secret sharing algorithm, such as the secret sharing algorithm discussed below.

At step/operation 704, the client computing entity 102 determines, based at least in part on the hashed user identifier, two user-identifying values (e.g., two pseudorandom user-identifying values): a multiplier value (m) and a secret value (b). For example, in some embodiments, the client computing entity 102 may apply a key derivation model (e.g., a key derivation function) to the hashed user identifier in order to generate the multiplier value and the secret value. In some embodiments, at least one of the multiplier value and the secret value is a 32-byte value, such as a 32-byte pseudorandom value. In some embodiments, at least one of the multiplier value and the secret value is a 64-byte value, such as a 64-byte pseudorandom value. The key derivation model may be a model that utilizes a key derivation function, where the key derivation function may in turn be able to process a master key (e.g., the hashed user identifier) in order to generate one or more subkeys (e.g., the multiplier value and the secret value), where the subkeys can be deterministically computed from the master key, but the subkeys cannot be used to generate the master key. An examples of a key derivation function is the key derivation function provided by libsodium.js, which is a sodium crypto library complied to WebAssembly and Javascript (see https://www.npmjs.com/package/libsodium). In some embodiments, one objective of generating the secret value based at least in part on the hashed user identifier and at runtime is to avoid storing the secret value on the client computing entity 102, which would expose the secret value to potential exposure resulting from various security risks such as attacks by external adversaries, attacks by insider adversaries, and attacks by imposter adversaries.

At step/operation 705, the client computing entity 102 transmits a request to obtain a data evaluation request identifier to the application server computing entity 106. The data evaluation request identifier may uniquely identify a data evaluation task requested by the client computing entity 102, where the data evaluation task may be configured to determine a desired evaluation conclusion for a user profile of the client computing entity 102 in accordance with corresponding user-provided data that may, during one or more user interaction sessions, be transmitted by the client computing entity 102 to the data evaluation system 101. An example of a data evaluation task is an insurance quote request that may be transmitted by a user profile of a client computing entity to a data evaluation system that is associated with an insurance company consumer interaction interface. In the noted example, the data evaluation request identifier may be a quote identifier. As described below, the data evaluation request identifier may be used to generate a data retrieval secret share that can then be used to obtain user-related data items (e.g., account identifier data and/or auditing public key data) from the data security management computing entity 103. In some embodiments, the request to obtain the data evaluation request identifier describes the hashed user identifier associated with the corresponding data evaluation request.

At step/operation 706, in response to receiving the request to obtain the data evaluation request identifier from the client computing entity 102, the application server computing entity 106 identifies (e.g., retrieves or generates) the data evaluation request identifier and transmits the data evaluation request identifier to the client computing entity 102. In some embodiments, to identify the data evaluation request identifier, the application server computing entity 106 first determines (e.g., based at least in part on data stored in the data storage component of the application server computing entity 106) whether the user profile associated with the request for the data evaluation request identifier is associated with an existing data evaluation task (e.g., an existing quote identifier) that has not been submitted for data evaluation. For example, the application server computing entity 106 may determine whether the target user profile (e.g., as identified by the account identifier of the target user profile, as identified by an Internet Protocol (IP) address of the client computing entity 102, as identified by a cookie identifier associated with the client computing entity 102, and/or the like) is associated with an existing insurance quote request that has not been submitted for rating. In some of the noted embodiments, in response to determining that the user profile associated with the request for the data evaluation request identifier is associated with an existing data evaluation task that has not been submitted for data evaluation, the application server computing entity 106 provides the existing data evaluation request identifier of the existing data evaluation task (e.g., the existing quote identifier of the existing insurance quote that has not been submitted for rating) as the data evaluation request identifier to the client computing entity 102. In some embodiments, in response to determining that the user profile associated with the request for the data evaluation request identifier is not associated with an existing data evaluation task that has not been submitted for data evaluation, the application server computing entity 106 generates a new data evaluation request identifier for a new data evaluation task (e.g., a new quote identifier for a new insurance quote) and provides the new data evaluation request identifier as the data evaluation request identifier to the client computing entity 102.

At step/operation 707, the client computing entity 102 generates a data retrieval secret share. The data retrieval secret share may be a data entity that is configured to, when transmitted to the data security management computing entity 103 by the client computing entity 102, cause the data security management computing entity 103 to transmit access-enabling data, where the access-enabling data is configured to enable the client computing entity 102 to access encrypted data stored on the data evaluation system 101. For example, the data retrieval secret share may, when transmitted to the data security management computing entity 103 by the client computing entity 102, cause the data security management computing entity 103 to transmit an account identifier and/or an auditing public key, where the account identifier may be configured to enable the client computing entity 102 to obtain encrypted user-provided data from the application server computing entity 106, and further where the auditing public key may be configured to enable the client computing entity 102 to encrypt a data auditing secret share. In some embodiments, to generate the data retrieval secret share, the client computing entity 102 generates the linear model $S_q=mQ+b$, where $S_q$ is a linear output value for the provided linear relationship model, m is the multiplier value discussed above, b is the secret value discussed above, and Q is a hash value generated based at least in part on the data retrieval request identifier discussed above. In some of the noted embodiments, after generating the noted linear model, the client computing entity 102 determines the value of $S_q$ based at least in part on the noted linear model and generates the data retrieval secret share based at least in part on the combination of the $S_q$ value and the Q value. An example of a data retrieval secret share is the tuple $(S_q, Q)$.

At step/operation 708, the client computing entity 102 generates a data evaluation secret share. The data evaluation secret share may be a data entity that is configured to, when transmitted to the data security management computing entity 103 by the client computing entity 102, cause the data security management computing entity 103 to trigger a group of operations, where the noted group of operations may be configured to cause the data evaluation system 101 to generate a data evaluation conclusion and transmit the data evaluation prediction to the client computing entity 102. For example, a data evaluation secret share may cause the data security management computing entity 103 to transmit an account identifier to the data evaluation computing entity 104 in order to cause the data evaluation computing entity 104 to retrieve encrypted user-provided data from the application server computing entity 106, decrypt the encrypted user-provided data, process the decrypted user-provided data to generate a data evaluation conclusion (e.g., a proposed insurance rate), and provide the data evaluation conclusion to the application server computing entity 106 for subsequent transmission to the client computing entity 102. In some embodiments, to generate the data evaluation secret share, the client computing entity 102 generates the linear model $S_r=mR+b$, where $S_r$ is a linear output value for the provided linear relationship model, m is the multiplier value discussed above, b is the secret value discussed above, and R is a random value and/or a pseudo-random value. In some of the noted embodiments, after generating the noted linear model, the client computing entity 102 determines the value of $S_r$ based at least in part on the noted linear model and generates the data evaluation secret share based at least in part on the combination of the $S_r$ value and the R value. An example of a data evaluation secret share is the tuple $(S_r, R)$.

At step/operation 709, the client computing entity 102 generates a data auditing secret share. The data auditing secret share may be a data entity that is configured to be utilized by a data evaluation system to decrypt audit records determined based at least in part on results of evaluating user-provided data associated with various data evaluation tasks in response to a data auditing request. An example of a data auditing request is a request to audit quote records in response to regulatory audit operations. In some of the noted embodiments, the data security management computing entity 103 may utilize data auditing secret shares to determine data auditing private keys that can, during an auditing process triggered by a data auditing request and in response to satisfaction of predefined audit validation criteria, be used to decrypt audit records associated with rated insurance quotes. In some embodiments, to generate the data auditing secret share, the client computing entity 102 generates the linear model $S_a=mA+b$, where $S_a$ is a linear output value for the provided linear relationship model, m is the multiplier value discussed above, b is the secret value discussed above, and A is a random value and/or a pseudorandom value. In some of the noted embodiments, after generating the noted linear model, the client computing entity 102 determines the value of $S_a$ based at least in part on the noted linear model and generates the data auditing secret share based at least in part on the combination of the $S_a$ value and the value. An example of a data auditing secret share is the tuple ($S_a$, A).

At step/operation 710, the client computing entity 102 transmits the data retrieval secret share to the data security management computing entity 103. The purpose of this transmission may be to cause the data security management computing entity 103 to identify a data field (e.g., a data field stored by the storage component of the data security management computing entity 103) associated with the target user profile based at least in part on determining a combination of the user-identifying value pairs maintained by the data security management computing entity 103 that satisfies the linear relationship described by the data retrieval secret share. To do so, the data security management computing entity 103 may utilize a Shamir Secret Sharing process.

At step/operation 711, in response to receiving the data retrieval secret share, the data security management computing entity 103 detects a target user data field associated with the target user profile based at least in part on the data retrieval secret share and transmits the target user data field to the client computing entity 102. To detect the target user data field associated with the target user profile, the data security management computing entity 103 may access a database that includes a group of per-user data fields, where each per-user data field is associated with a corresponding user profile, and where each per-user data field for a corresponding user profile is associated with a combination of the user-identifying values determined based at least in part on the hashed user identifier of the corresponding user profile, and further where each per-user data field describes at least one of an account identifier of the corresponding user profile and an auditing public key of the corresponding user profile. Therefore, in some embodiments, the data security management computing entity 103 may maintain pairs of user identifying values $(m_1, b_1), (m_2, b_2), \ldots, (m_n, b_n)$, where each pair is associated with a per-user data field for a particular user profile. In some of the noted embodiments, to determine the target user data field, the data security management computing entity 103 may detect a pair of user identifying values $(m_t, b_t)$ that satisfy the equation $S_q=m_tQ+b_t$, where ($S_q$, Q) is described by the data retrieval secret share. Thereafter, the data security management computing entity 103 may detect the per-user data field associated with the pair $(m_t, b_t)$ and use at least some of the subfields (e.g., an account identifier subfield and an auditing public key subfield) of the per-user-data field to generate the target user data field, and may subsequently transmit the target user data field to the client computing entity 102.

At step/operation 712, the client computing entity 102 generates a user data private key based at least in part on the user identifying values and uses the user data private key to encrypt user-provided data provided by the target user profile. In some embodiments, the client computing entity 102 generates the user data private key based at least in part on the secret value (b). For example, the client computing entity 102 may generate the user data private key by applying a one-way transformation model to the secret value. Examples of user-provided data include data entered to obtain an insurance quote, such as user identifying data, user vehicle data (e.g., entered using the input entry user interface 1200 of FIG. 12), user driving history data, user financial account data, user location data, and/or the like. Importantly, such user-provided data are encrypted using a user data private key that is maintained only by the client computing entity 102, which does not have persistent access to decrypted user identifying information.

At step/operation 713, the client computing entity 102 transmits (e.g., submits) the encrypted user-provided data to the application server computing entity 106. Subsequent to encryption of the user provided data using a user data private key that is maintained only by the client computing entity 102, the client computing entity 102 may transmit the encrypted user-provided data to the application server computing entity 106 for storage in the storage component of the application server computing entity 106. The request to store the encrypted user-provided data may also include the account identifier of the target user profile as described by the target user data field, and the application server computing entity 106 may be configured to store (e.g., in the storage component of the application server computing entity 106) the encrypted user-provided data according to a data storage scheme that describes the association/relation/binding of the encrypted user-provided data and the account identifier.

At step/operation 714, the client computing entity 102 encrypts the data auditing secret share using the auditing public key transmitted as part of the target user data field. In some embodiments, one objective of this step/operation may be to ensure that subsequent transmission of the data auditing secret share does not expose a non-encrypted version of the data auditing secret share to security risks such as attacks by external adversaries, attacks by insider adversaries, and attacks by imposter adversaries. In some embodiments, the data security management computing entity 103 maintains a data auditing private key corresponding to the data auditing public key available to the client computing entity 102, where the data auditing private key can be used to decrypt the encrypted data auditing private key.

At step/operation 715, the client computing entity 102 transmits (e.g., submits) the encrypted data auditing secret share to the data security management computing entity 103, which may store the encrypted data auditing secret share in an accessible storage location (e.g., in the storage component of the data security management computing entity 103). In some embodiments, the data security management computing entity 103 first decrypts the encrypted data auditing secret share using a data auditing private key maintained by the data security management computing entity 103, and then stores the decrypted data auditing secret share in an accessible storage location (e.g., in the storage component of the data security management computing entity 103).

B. Retrieval of Historical User-Provided Data

FIG. 8 is a network transmission flow diagram of an example process 800 for retrieval of historical user-provided data according to the anonymized data retention aspects of the present invention. Via the various steps/operations of the process 800, the data retrieval system 101 can provide historical user-provided data (e.g., in order to prefill a user form) without storing unencrypted versions of user-provided data, user data private keys used to encrypt the user-provided data, and user data public keys that is configured to decrypt the encrypted user-provided data. Example applications of the process 800 include prefilling user forms when a user profile seeks to obtain a requote for an insurance product or to continue working on a previously unsubmitted insurance quote form.

The process 800 begins at step/operation 801 when the client computing entity 102 generates a user identifier associated with a target user profile. The user identifier may uniquely identify the target user profile, i.e., a user profile of the client computing entity 102 whose corresponding data is being transmitted to the data evaluation system 101. In some embodiments, the user identifier is generated based at least in part on one or more selected fields of user-provided data associated with the user profile, for example based at least in part on one or more fields of user-provided data that are deemed to include sensitive information associated with the user profile and/or based at least in part on one or more fields of user-provided data that are deemed to include identifying information associated with the user profile. For example, in some embodiments, the user identifier may be generated based at least in part on an email address of the user profile, a date of birth of the user profile, or a combination of an email address of the user profile and a date of birth of the user profile. In some embodiments, to generate the user identifier, the client computing entity 102 may merge (e.g., concatenate) the selected fields of the user-provided data. In some embodiments, one objective behind generating the user identifier based at least in part on user-provided data is to eliminate the need for storing the user identifier on the client computing entity 102, which in turn reduces the vulnerability of the architecture 100 to security risks such as attacks by external adversaries, attacks by insider adversaries, and attacks by imposter adversaries. In some of the noted embodiments, because the user identifier can be generated by a predefined combination of defined user-provided fields, the noted user identifier can be generated by the client computing entity 102 at runtime based at least in part on user-provided data and thus the noted user identifier does not need to be persistently stored on the client computing entity 102.

At step/operation 802, the client computing entity 102 transmits a request to generate a hashed user identifier based at least in part on the user identifier to the data security management computing entity 103. The purpose of transmitting the noted hash generation request may be to cause the data security management computing entity 103 to generate the hashed user identifier by applying a one-way deterministic model to the user identifier in order to generate a resulting pseudorandom value, where the resulting pseudorandom value does not directly identify the user identifier and cannot be used to generate the user identifier. One objective of generating the hashed user identifier in the noted manner may be to eliminate the need for storing the user identifier on the data evaluation system 101, which in turn reduces the vulnerability of the data evaluation system 101 to security attacks such as attacks by external adversaries, attacks by insider adversaries, and attacks by imposter adversaries. In some of the noted embodiments, because the data security management computing entity 103 can perform its operations using the hashed user identifier, the data security management computing entity 103 does not need to store the user identifier which may include sensitive user-provided data fields.

At step/operation 803, in response to receiving the request to generate the hashed user identifier from the client computing entity 102, the data security management computing entity 103 generates the hashed user identifier and transmits the generated hashed user identifier to the client computing entity 102. As noted above, to generate the hashed user identifier, the data security management computing entity 103 may apply one-way deterministic model to the user identifier in order to generate a resulting pseudorandom value, where the resulting pseudorandom value does not directly identify the user identifier and cannot be used to generate the user identifier. An example of the noted one-way deterministic model is an oblivious pseudorandom function (OPRF) model, which may process the user identifier using an OPRF secret key (e.g., an OPRF secret key, such as an OPRF secret key maintained in a storage component of the data security management computing entity 103) in order to generate the hashed user identifier, where the OPRF model is configured to generate the hashed user identifier based at least in part on the user identifier but not vice versa. However, while various embodiments of the present invention describe generating a hashed user identifier by using an OPRF model, a person of ordinary skill in the relevant technology will recognize that other hashing schemes, such as hashing schemes utilizing one-way deterministic models other than the described OPRF model, may also be utilizing in addition to or instead of the OPRF-based schemes in order to generate a hashed user identifier based at least in part on a user identifier. In some embodiments, the hashed user identifier is configured to have a sufficient entropy to enable using the hashed user identifier in a secret sharing algorithm, such as the secret sharing algorithm discussed below.

At step/operation 804, the client computing entity 102 determines, based at least in part on the hashed user identifier, two user-identifying values (e.g., two pseudorandom user-identifying values): a multiplier value (m) and a secret value (b). For example, in some embodiments, the client computing entity 102 may apply a key derivation model (e.g., a key derivation function) to the hashed user identifier in order to generate the multiplier value and the secret value. In some embodiments, at least one of the multiplier value and the secret value is a 32-byte value, such as a 32-byte pseudorandom value. The key derivation model may be a model that utilizes a key derivation function, where the key derivation function may in turn be able to process a master key (e.g., the hashed user identifier) in order to generate one or more subkeys (e.g., the multiplier value and the secret value), where the subkeys can be deterministically computed from the master key, but the subkeys cannot be used to generate the master key. An examples of a key derivation function is the key derivation function provided by libsodium.js, which is a sodium crypto library complied to WebAssembly and Javascript (see https://www.npmjs.com/package/libsodium). In some embodiments, one objective of generating the secret value based at least in part on the hashed user identifier and at runtime is to avoid storing the secret value on the client computing entity 102, which would expose the secret value to potential exposure resulting from various security risks such as attacks by external adversaries, attacks by insider adversaries, and attacks by imposter adversaries.

At step/operation 805, the client computing entity 102 transmits a request to obtain a data evaluation request identifier to the application server computing entity 106. The data evaluation request identifier may uniquely identify a data evaluation task requested by the client computing entity 102, where the data evaluation task may be configured to determine a desired evaluation conclusion for a user profile of the client computing entity 102 in accordance with corresponding user-provided data that may during one or more user interaction sessions be transmitted by the client computing entity 102 to the data evaluation system 101. An example of a data evaluation task is an insurance quote request that may be transmitted by a user profile of a client computing entity to a data evaluation system that is associated with an insurance company consumer interaction interface. In the noted example, the data evaluation request identifier may be a quote identifier. As described below, the data evaluation request identifier may be used to generate a data retrieval secret share that can then be used to obtain user-related data items (e.g., account identifier data and/or auditing public key data) from the data security management computing entity 103. In some embodiments, the request to obtain the data evaluation request identifier describes the hashed user identifier associated with the corresponding data evaluation request.

At step/operation 806, in response to receiving the request to obtain the data evaluation request identifier from the client computing entity 102, the application server computing entity 106 identifies (e.g., retrieves or generates) the data evaluation request identifier and transmits the data evaluation request identifier to the client computing entity 102. In some embodiments, to identify the data evaluation request identifier, the application server computing entity 106 first determines (e.g., based at least in part on data stored in the data storage component of the application server computing entity 106) whether the user profile associated with the request for the data evaluation request identifier is associated with an existing data evaluation task that has not been submitted for data evaluation. For example, the application server computing entity 106 may determine whether the target user profile (e.g., as identified by the account identifier of the target user profile, as identified by an Internet Protocol (IP) address of the client computing entity 102, as identified by a cookie identifier associated with the client computing entity 102, and/or the like) is associated with an existing insurance quote request that has not been submitted for rating. In some of the noted embodiments, in response to determining that the user profile associated with the request for the data evaluation request identifier is associated with an existing data evaluation task that has not been submitted for data evaluation, the application server computing entity 106 provides the existing data evaluation request identifier of the existing data evaluation task (e.g., the existing quote identifier of the existing insurance quote that has not been submitted for rating) as the data evaluation request identifier to the client computing entity 102. In some embodiments, in response to determining that the user profile associated with the request for the data evaluation request identifier is not associated with an existing data evaluation task that has not been submitted for data evaluation, the application server computing entity 106 generates a new data evaluation request identifier for a new data evaluation task (e.g., a new quote identifier for a new insurance quote) and provides the new data evaluation request identifier as the data evaluation request identifier to the client computing entity 102.

At step/operation 807, the client computing entity 102 generates a data retrieval secret share. The data retrieval secret share may be a data entity that is configured to, when transmitted to the data security management computing entity 103 by the client computing entity 102, cause the data security management computing entity 103 to transmit access-enabling data, where the access-enabling data is configured to enable the client computing entity 102 to access encrypted data stored on the data evaluation system 101. For example, the data retrieval secret share may, when transmitted to the data security management computing entity 103 by the client computing entity 102, cause the data security management computing entity 103 to transmit an account identifier and/or an auditing public key, where the account identifier may be configured to enable the client computing entity 102 to obtain encrypted user-provided data from the application server computing entity 106, and further where the auditing public key may be configured to enable the client computing entity 102 to encrypt a data auditing secret share. In some embodiments, to generate the data retrieval secret share, the client computing entity 102 generates the linear model $S_q=mQ+b$, where $S_q$ is a linear output value for the provided linear relationship model, m is the multiplier value discussed above, b is the secret value discussed above, and Q is a hash value generated based at least in part on the data retrieval request identifier discussed above. In some of the noted embodiments, after generating the noted linear model, the client computing entity 102 determines the value of $S_q$ based at least in part on the noted linear model and generates the data retrieval secret share based at least in part on the combination of the $S_q$ value and the Q value. An example of a data retrieval secret share is the tuple ($S_q$, Q).

At step/operation 808, the client computing entity 102 transmits the data retrieval secret share to the data security management computing entity 103. The purpose of this transmission may be to cause the data security management computing entity 103 to identify a data field (e.g., a data field stored by the storage component of the data security management computing entity 103) associated with the target user profile based at least in part on determining a combination of the user-identifying value pairs maintained by the data security management computing entity 103 that satisfies the linear relationship described by the data retrieval secret share. To do so, the data security management computing entity 103 may utilize a Shamir Secret Sharing process.

At step/operation 809, in response to receiving the data retrieval secret share, the data security management computing entity 103 detects a target user data field associated with the target user profile based at least in part on the data retrieval secret share and transmits the target user data field to the client computing entity 102. To detect the target user data field associated with the target user profile, the data security management computing entity 103 accesses a database that includes a group of per-user data fields, where each per-user data field is associated with a corresponding user profile, and where each per-user data field for a corresponding user profile is associated with a combination of the user-identifying values determined based at least in part on the hashed user identifier of the corresponding user profile, and further where each per-user data field describes at least one of an account identifier of the corresponding user profile and an auditing public key of the corresponding user profile. Therefore, in some embodiments, the data security management computing entity 103 may maintain pairs of user identifying values $(m_1, b_1), (m_2, b_2), \ldots, (m_n, b_n)$, where each pair is associated with a per-user data field. In some of the noted embodiments, to determine the target user data field, the data security management computing entity 103 may detect a pair of user identifying values $(m_t, b_t)$ that satisfy the equation $S_q=m_tQ+b_t$, where ($S_q$, Q) is described by the data retrieval secret share. Thereafter, the data security management computing entity 103 may detect the per-user data field associated with the pair $(m_t, b_t)$ and use at least some of the subfields (e.g., an account identifier subfield and an auditing public key subfield) of the per-user-data field to generate the target user data field, and may subsequently transmit the target user data field to the client computing entity 102.

At step/operation 810, the client computing entity 102 transmits the account identifier to the application server computing entity 106 as part of a request to obtain encrypted historical user-provided data. Examples of encrypted historical user-provided data include encrypted versions of fields submitted by the client computing entity 102 as part of past data evaluation tasks and/or as part of past user interaction sessions, where the encryption of the fields may have been performed based at least in part on a user data private key determined based at least in part on the secret value. As discussed above, the account identifier may be used by the application server computing entity 106 to index encrypted user-provided data to account identifiers. In some embodiments, the client computing entity 102 utilizes this feature to request the encrypted user-provided data based at least in part on the account identifier.

At step/operation 811, in response to receiving the request to obtain the encrypted historical user-provided data, the application server computing entity 106 proceeds to retrieve the encrypted historical user-provided data and subsequently transmits the encrypted historical user-provided data to the client computing entity 102. In some embodiments, the application server computing entity 106 retrieves the encrypted historical user-provided data from the storage component of the application server computing entity 106 in accordance with the account identifier provided as part of the request to obtain the encrypted historical user-provided data, and transmits the noted retrieved data to the client computing entity 102.

At step/operation 812, in response to receiving the encrypted historical user-provided data from the application server computing entity 106, the client computing entity 102 decrypts the encrypted historical user-provided data in order to generate decrypted historical user-provided data. As noted above, the encrypted historical user-provided data may have been generated based at least in part on a user data private key maintained by the client computing entity 102 and/or based at least in part on a user data private key that can be recreated by the client computing entity 102 (e.g., based at least in part on applying a key derivation model to the hashed user identifier). In some embodiments, the client computing entity 102 retrieves/recreates this user data private key and uses it to decrypt the encrypted historical user-provided data in order to generate the decrypted historical user-provided data. In some embodiments, the client computing entity 102 performs one or more actions based at least in part on the decrypted historical user-provided data. For example, the client computing entity 102 may prefill a form based at least in part on the decrypted historical user-provided data.

C. Processing Data Evaluation Requests

FIG. 9 is a network flow diagram of an example process 900 for requesting a data evaluation task in accordance with the anonymized data retention concepts of the present invention. Via the various steps/operations of the process 900, the data evaluation system 101 can cause the data evaluation computing entity 104 to perform a data evaluation task (e.g., an insurance quote rating task) based at least in part on encrypted data retrieved from the application server computing entity 106 without transmitting sensitive user data (e.g., user identifying information that can be used to track real-world identity of a user profile) to the data evaluation computing entity 104.

The process 900 begins at step/operation 901 when the client computing entity 102 transmits a data evaluation secret share to the data security management computing entity 103. The data evaluation secret share may be a data entity that is configured to, when transmitted to the data security management computing entity 103 by the client computing entity 102, cause the data security management computing entity 103 to trigger a group of operations, where the noted group of operations may be configured to cause the data evaluation system 101 to generate a data evaluation conclusion and transmit the data evaluation prediction to the client computing entity 102. For example, a data evaluation secret share may cause the data security management computing entity 103 to transmit an account identifier to the data evaluation computing entity 104 in order to cause the data evaluation computing entity 104 to retrieve encrypted user-provided data from the application server computing entity 106, decrypt the encrypted user-provided data, process the decrypted user-provided data to generate a data evaluation conclusion (e.g., a proposed insurance rate), and provide the data evaluation conclusion to the application server computing entity 106 for subsequent transmission to the client computing entity 102. In some embodiments, to generate the data evaluation secret share, the client computing entity 102 generates the linear model $S_r=mR+b$, where $S_r$ is a linear output value for the provided linear relationship model, m is the multiplier value discussed above, b is the secret value discussed above, and R is a random value and/or a pseudo-random value. In some of the noted embodiments, after generating the noted linear model, the client computing entity 102 determines the value of $S_r$ based at least in part on the noted linear model and generates the data evaluation secret share based at least in part on the combination of the $S_r$ value and the R value. An example of a data evaluation secret share is the tuple $(S_r, R)$.

At step/operation 902, in response to receiving the data evaluation secret share, the data security management computing entity 103 detects a user account of the target user profile based at least in part on the data evaluation secret share. To detect the user account associated with the target user profile, the data security management computing entity 103 may access a database that includes a group of per-user data fields, where each per-user data field is associated with a corresponding user profile, and where each per-user data field for a corresponding user profile is associated with a combination of the user-identifying values determined based at least in part on the hashed user identifier of the corresponding user profile, and further where each per-user data field describes an account identifier of the corresponding user profile. Therefore, in some embodiments, the data security management computing entity 103 may maintain pairs of user identifying values $(m_1, b_1), (m_2, b_2), \ldots, (m_n, b_n)$, where each pair is associated with a per-user data field. In some of the noted embodiments, to determine the account user account associated with the target user profile, the data security management computing entity 103 may detect a pair of user identifying values $(m_t, b_t)$ that satisfy the equation $S_r=m_tR+b_t$, where $(S_r, R)$ is described by the data evaluation secret share. Thereafter, the data security management computing entity 103 may detect the per-user data field associated with the pair $(m_t, b_t)$ and detect the user account described by the detected per-user data field.

At step/operation 903, in response to detecting the user account of the target user profile, the data security management computing entity 103 transmits the user account and the secret value (b) of the target user profile to the data evaluation computing entity 104. In some embodiments, one objective behind transmission of the user account to the data evaluation computing entity 104 is to enable the data evaluation computing entity 104 to retrieve the encrypted user-provided data associated with the user account from the application server computing entity 106, while one objective behind transmission of the secret value to the data evaluation computing entity 104 is to enable the data evaluation computing entity 104 to compute (e.g., using a key derivation model) the user data private key that can be used to decrypt the encrypted user-provided data after retrieval of the encrypted user-provided data from the application server computing entity 106.

At step/operation 904, the data evaluation computing entity 104 transmits a request to obtain encrypted user-provided data to the application server computing entity 106, where the request describes the account identifier. Examples of encrypted historical user-provided data include encrypted versions of fields submitted by the client computing entity 102 as part of past data evaluation tasks and/or as part of past user interaction sessions, where the encryption of the fields may have been performed based at least in part on a user data private key determined based at least in part on the secret value. As discussed above, the account identifier may be used by the application server computing entity 106 to index encrypted user-provided data to account identifiers. In some embodiments, the client computing entity 102 utilizes this feature to request the encrypted user-provided data based at least in part on the account identifier.

At step/operation 905, in response to receiving the request to obtain the encrypted historical user-provided data from the data evaluation computing entity 104, the application server computing entity 106 proceeds to retrieve the encrypted historical user-provided data and subsequently transmits the encrypted historical user-provided data to the data evaluation computing entity 104. In some of the noted embodiments, the application server computing entity 106 retrieves the encrypted historical user-provided data from the storage component of the application server computing entity 106 in accordance with the account identifier provided as part of the request to obtain the encrypted historical user-provided data, and then transmits the noted retrieved data to the data evaluation computing entity 104.

At step/operation 906, in response to receiving the encrypted historical user-provided data from the application server computing entity 106, the data evaluation computing entity 104 decrypts the encrypted historical user-provided data to generate decrypted historical user-provided data. As noted above, the encrypted historical user-provided data may have been generated based at least in part on a user data private key generated based at least in part on the secret key and using a key derivation model. In some of the noted embodiments, the data evaluation computing entity 104 generates this user data private key based at least in part on the secret key (i.e., the secret key that the data evaluation computing entity 104 obtained from the data security management computing entity 103) and uses it to decrypt the encrypted historical user-provided data in order to generate the decrypted historical user-provided data.

At step/operation 907, in response to generating the decrypted historical user-provided data, the data evaluation computing entity 104 performs one or more evaluation actions based at least in part on the decrypted historical user-provided data in order to generate evaluation conclusion data, while at step/operation 908 the evaluation conclusion data to the application server computing entity 106. As discussed above, an example of a data evaluation task is an insurance quote rating action, while an example of an evaluation conclusion is a proposed rate for an insurance quote as determined by the data evaluation computing entity 104 based at least in part on the decrypted historical user-provided data. In some embodiments, to determine an evaluation conclusion, the data evaluation computing entity 104 rates an insurance quote and stores the rating factors in an accessible storage location (e.g., in a storage subsystem of the data evaluation computing entity 104).

At step/operation 909, in response to receiving the evaluation conclusion from the data evaluation computing entity 104, the application server computing entity 106 transmits the evaluation conclusion to the client computing entity 102. In some embodiments, the application server computing entity 106 transmits data for one or more evaluation output user interfaces (e.g., one or more insurance quote rate output user interfaces, such as the insurance quote rate user interface 1300 of FIG. 13) that are configured to be displayed on the client computing entity 102. While various embodiments of the present invention describe that the data evaluation computing entity 104 uses the application server computing entity 106 to interact with the client computing entity 102, a person of ordinary skill in the relevant technology will recognize that other networking arrangements may be plausible or even desirable. For example, in some embodiments, the data evaluation computing entity 104 may interact directly with the client computing entity 102 by transmitting evaluation conclusion data and/or data for one or more evaluation output user interfaces directly to the client computing entity 102.

D. Processing Data Auditing Requests

FIG. 10 is a flowchart diagram of an example process 1000 for performing a data auditing operation according to the anonymized data retention aspects of the present invention. Via the various steps/operations of the process 1000, the data evaluation system 101 can generate an audit determination based at least in part on audit records obtained from the data evaluation computing entity 104, where the audit records are decrypted using a data audit private key that is determined based at least in part on a Shamir Secret Coding scheme that uses data audit validation secret shares transmitted to the data evaluation system 101 by a group of audit agent computing entities 105 (e.g., employee computing entities that are configured to receive audit records to process them as part of an audit workflow).

The process 1000 begins at step/operation 1001 when each of the audit agent computing entities 105 transmits a data audit validation secret share to the data security management computing entity 103. A data audit validation secret share may be a combination of values that correspond to applicable input and output of a data audit validation model, where the data audit validation model may be a two-dimensional polynomial of degree n that relates one or more multiplier/coefficient values to a y-intercept value. For example, if the data audit validation model describes a degree-one polynomial, then the data audit validation model relates the multiplier value m to the y-intercept value b, for example as is the case with the degree-one audit validation model $Y=mX+b$. As another example, if the data audit validation model is a degree-two polynomial, then the data audit validation model relates the multiplier values $m_1$ and $m_2$ to the y-intercept value b, for example as is the case with the degree-three audit validation model $Y=m_1X^2+m_2X+b$. As yet another example, if the data audit validation model is a degree-three polynomial, then the data audit validation model relates the multiplier values $m_1$, $m_2$, and $m_3$ to the y-intercept value b, for example as is the case with the degree-three audit validation model $Y=m_2X^3+m_2X^2+m_3X+b$.

At step/operation 1002, after the data security management computing entity 103 receives a required number of the data audit validation secret shares, the data security management computing entity 103 processes the required number of the data audit validation secret shares to generate the y-intercept of the data audit validation model and uses the y-intercept to generate the data audit private key. In some embodiments, given that each data audit validation secret share describes a two-dimensional point that satisfies the data audit validation model, the required number of the data audit validation scores for an n-degree data audit validation model is n+1. For example, if the data audit validation model is a degree-one polynomial, then the required number of the data audit validation secret shares is two, which require receiving at least two distinct data audit validation secret shares before generating a reliable y-intercept that can in turn be used to generate the private key.

At step/operation 1003, the data security management computing entity 103 decrypts audit record identifier data based at least in part on the data audit private key, while at step/operation 1004 the data security management computing entity 103 uses the decrypted audit record identifier data to request encrypted audit records from the data evaluation computing entity 104, which the data security management computing entity 103 receives at step/operation 1005. In some embodiments, as part of the step/operation 1003, the data security management computing entity 103 decrypts audit shares, calculates insurance quotes keys, and generates a request for insurance quote records, which the data security management computing entity 103 subsequently transmits the request for insurance quote records to the data evaluation computing entity 104.

At step/operation 1006, the data security management computing entity 103 generates a data audit determination based at least in part on the audit records, and at step/operation 1007 the data security management computing entity 103 transmits the data audit determination to at least some of the audit agent computing entities 105. In some embodiments, to generate the data audit determination, the data security management computing entity 103 decrypts rating records retrieved from the data evaluation computing entity 104 and uses the decrypted rating records to generate the data audit determination. Examples of data audit determinations include data audit report and/or data audit requirement descriptions. In some embodiments, the data security management computing entity 103 transmits user interface data describing the data audit determinations to at least some of the audit agent computing entities 105 for display by at least a portion of the audit agent computing entities 105.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for anonymized encryption of user-provided data, the computer-implemented method comprising:
   generating, by one or more processors, a hashed user identifier based at least in part on a received user identifier;
   transmitting, by the one or more processors, the hashed user identifier to an external computing entity;
   receiving, by the one or more processors, a data retrieval secret share from the external computing entity, wherein: (i) the data retrieval secret share is selected from a plurality of per-user-functionality secret shares, (ii) the plurality of per-user-functionality secret shares are generated based at least in part on a secret value, (iii) the secret value is generated based at least in part on the hashed user identifier, (iv) the secret value is used to generate a user data private key, and (v) the external computing entity is configured to encrypt the user-provided data using the user data private key to generate encrypted user-provided data prior to transmission of the encrypted user-provided data;
   receiving, by the one or more processors, a data evaluation secret share of the plurality of Der-user-functionality secret shares from the external computing entity, wherein the data evaluation secret share is generated based at least in part on the secret value; and
   in response to receiving the data evaluation secret share:
      identifying, by the one or more processors, an account identifier based at least in part on the data evaluation secret share,
      determining, by the one or more processors, the secret value based at least in part on the data evaluation secret share, and
      transmitting, by the one or more processors, the account identifier and the secret value to a data evaluation computing entity, wherein the data evaluation computing entity is configured to: (i) retrieve the encrypted user-provided data using the account identifier, (ii) subsequent to retrieving the encrypted user-provided data, decrypt the encrypted user-provided data using the secret value to generate decrypted user-provided data, (iii) generate a data evaluation based at least in part on the decrypted user-provided data, and (iv) cause the data evaluation to be transmitted to the external computing entity.

2. The computer-implemented method of claim 1, further comprising:
   in response to receiving the data retrieval secret share, transmitting, by the one or more processors, the account identifier to the external computing entity, wherein: (i) the account identifier is used to request the encrypted user-provided data by the external computing entity, and (ii) subsequent to receiving the encrypted user-provided data, the external computing entity is configured to decrypt the encrypted user-provided data based at least in part on the user data private key to generate the decrypted user-provided data and display the decrypted user-provided data.

3. The computer-implemented method of claim 1, wherein generating the data evaluation secret share comprises:
   generating, by the one or more processors, a multiplier value based at least in part on the hashed user identifier;
   processing, by the one or more processors, the secret value, a randomly-generated value, and the multiplier value in accordance with a linear relationship model to generate a linear output value; and generating, by the one or more processors, the data evaluation secret share based at least in part on the multiplier value and the linear output value.

4. The computer-implemented method of claim 1, further comprising:

in response to receiving, by the one or more processors, the data retrieval secret share, transmitting the account identifier and an auditing public key to the external computing entity; and receiving, by the one or more processors, an encrypted data audit secret share from the external computing entity, wherein: (i) the encrypted data audit secret share is generated by encrypting a data audit secret share of the plurality of per-user-functionality secret shares using the auditing public key, and (ii) the data audit secret share is generated based at least in part on the secret value.

5. The computer-implemented method of claim 4, wherein generating the data audit secret share comprises:

generating, by the one or more processors, a multiplier value based at least in part on the hashed user identifier;

processing, by the one or more processors, the secret value, a randomly-generated value, and the multiplier value in accordance with a linear relationship model to generate a linear output value; and generating, by the one or more processors, the data audit secret share based at least in part on the multiplier value and the linear output value.

6. The computer-implemented method of claim 1, further comprising:

receiving, by the one or more processors, a data audit request associated with the user-provided data; and in response to receiving the data audit request:

receiving, by the one or more processors, a required number of data audit validation secret shares, wherein the required number of data audit validation secret shares are related to a data audit private key using a polynomial equation whose degree is determined based at least in part on a count of the required number of data audit validation secret shares;

determining, by the one or more processors, the data audit private key based at least in part on the required number of data audit validation secret shares;

determining, by the one or more processors, one or more audit records using the required number of data audit validation secret shares;

determining, by the one or more processors, one or more decrypted audit records by processing the one or more audit records using the data audit private key; and transmitting, by the one or more processors, the one or more decrypted audit records to one or more auditor agent computing entities.

7. The computer-implemented method of claim 1, wherein generating the hashed user identifier comprises:

receiving, by the one or more processors, a user identifier from the external computing entity; and processing, by the one or more processors, the user identifier using an oblivious pseudorandom function model to generate the hashed user identifier.

8. The computer-implemented method of claim 7, wherein the user identifier is determined based at least in part on one or more selected data fields of the user-provided data.

9. The computer-implemented method of claim 1, wherein generating the data retrieval secret share comprises:

generating, by the one or more processors, a multiplier value based at least in part on the hashed user identifier;

receiving, by the one or more processors, a data evaluation request identifier;

processing, by the one or more processors, the secret value, the multiplier value, and the multiplier value in accordance with a linear relationship model to generate a linear output value; and generating, by the one or more processors, the data retrieval secret share based at least in part on the multiplier value and the linear output value.

10. An apparatus for anonymized encryption of user-provided data, the apparatus comprising at least one processor and at least one memory including program code, the at least one memory and the program code configured to, with the at least one processor, cause the apparatus to at least:

generate a hashed user identifier based at least in part on a received user identifier;

transmit the hashed user identifier to an external computing entity; and receive a data retrieval secret share from the external computing entity, wherein: (i) the data retrieval secret share is selected from a plurality of per-user-functionality secret shares, (ii) the plurality of per-user-functionality secret shares are generated based at least in part on a secret value, (iii) the secret value is generated based at least in part on the hashed user identifier, (iv) the secret value is used to generate a user data private key, and (v) the external computing entity is configured to encrypt the user-provided data using the user data private key to generate encrypted user-provided data prior to transmission of the encrypted user-provided data;

receive a data evaluation secret share of the plurality of per-user-functionality secret shares from the external computing entity, wherein the data evaluation secret share is generated based at least in part on the secret value; and in response to receiving the data evaluation secret share:

identify an account identifier based at least in part on the data evaluation secret share, determine the secret value based at least in part on the data evaluation secret share, and transmit the account identifier and the secret value to a data evaluation computing entity, wherein the data evaluation computing entity is configured to: (i) retrieve the encrypted user-provided data using the account identifier, (ii) subsequent to retrieving the encrypted user-provided data, decrypt the encrypted user-provided data using the secret value to generate decrypted user-provided data, (iii) generate a data evaluation based at least in part on the decrypted user-provided data, and (iv) cause the data evaluation to be transmitted to the external computing entity.

11. The apparatus of claim 10, wherein the at least one memory and the program code are further configured to, with the at least one processor, cause the apparatus to at least:

in response to receiving the data retrieval secret share, transmit the account identifier to the external computing entity, wherein: (i) the account identifier is used to request the encrypted user-provided data by the external computing entity, and (ii) subsequent to receiving the encrypted user-provided data, the external computing entity is configured to decrypt the encrypted user-provided data based at least in part on the user data private key to generate the decrypted user-provided data and display the decrypted user-provided data.

12. The apparatus of claim 10, wherein the at least one memory and the program code are further configured to, with the at least one processor, cause the apparatus to at least:

in response to receiving the data retrieval secret share, transmit the account identifier and an auditing public key to the external computing entity; and receive an encrypted data audit secret share from the external computing entity, wherein: (i) the encrypted data audit secret share is generated by encrypting a data audit secret share of the plurality of per-user-functionality secret shares using the auditing public key, and (ii) the data audit secret share is generated based at least in part on the secret value.

13. The apparatus of claim 10, wherein the at least one memory and the program code are further configured to, with the at least one processor, cause the apparatus to at least:

receive a data audit request associated with the user-provided data; and in response to receiving the data audit request:
receive a required number of data audit validation secret shares, wherein the required number of data audit validation secret shares are related to a data audit private key using a polynomial equation whose degree is determined based at least in part on a count of the required number of data audit validation secret shares;

determine the data audit private key based at least in part on the required number of data audit validation secret shares;

determine one or more audit records using the required number of data audit validation secret shares;

determine one or more decrypted audit records by processing the one or more audit records using the data audit private key; and transmit the one or more decrypted audit records to one or more auditor agent computing entities.

14. The apparatus of claim 10, wherein generating the hashed user identifier comprises:

receiving a user identifier from the external computing entity; and processing the user identifier using an oblivious pseudo-random function model to generate the hashed user identifier.

15. The apparatus of claim 10, wherein generating the data retrieval secret share comprises:

generating a multiplier value based at least in part on the hashed user identifier;

receiving a data evaluation request identifier;

processing the secret value, the multiplier value, and the multiplier value in accordance with a linear relationship model to generate a linear output value; and generating the data retrieval secret share based at least in part on the multiplier value and the linear output value.

16. A computer program product for anonymized encryption of user-provided data, the computer program product comprising at least one non-transitory computer-readable storage medium having computer-readable program code portions stored therein, the computer-readable program code portions configured to:

generate a hashed user identifier based at least in part on a received user identifier;

transmit the hashed user identifier to an external computing entity;

receive a data retrieval secret share from the external computing entity, wherein: (i) the data retrieval secret share is selected from a plurality of per-user-functionality secret shares, (ii) the plurality of per-user-functionality secret shares are generated based at least in part on a secret value, (iii) the secret value is generated based at least in part on the hashed user identifier, (iv) the secret value is used to generate a user data private key, and (v) the external computing entity is configured to encrypt the user-provided data using the user data private key to generate encrypted user-provided data prior to transmission of the encrypted user-provided data;

receive a data evaluation secret share of the plurality of per-user-functionality secret shares from the external computing entity, wherein the data evaluation secret share is generated based at least in part on the secret value; and in response to receiving the data evaluation secret share:
identify an account identifier based at least in part on the data evaluation secret share, determine the secret value based at least in part on the data evaluation secret share, and transmit the account identifier and the secret value to a data evaluation computing entity, wherein the data evaluation computing entity is configured to: (i) retrieve the encrypted user-provided data using the account identifier, (ii) subsequent to retrieving the encrypted user-provided data, decrypt the encrypted user-provided data using the secret value to generate decrypted user-provided data, (iii) generate a data evaluation based at least in part on the decrypted user-provided data, and (iv) cause the data evaluation to be transmitted to the external computing entity.

17. The computer program product of claim 16, wherein the computer-readable program code portions are further configured to:

in response to receiving the data retrieval secret share, transmit the account identifier to the external computing entity, wherein: (i) the account identifier is used to request the encrypted user-provided data by the external computing entity, and (ii) subsequent to receiving the encrypted user-provided data, the external computing entity is configured to decrypt the encrypted user-provided data based at least in part on the user data private key to generate the decrypted user-provided data and display the decrypted user-provided data.

* * * * *